(12) United States Patent
Huang et al.

(10) Patent No.: US 11,880,524 B2
(45) Date of Patent: Jan. 23, 2024

(54) DISPLAY TOUCH DEVICE WITH POWER SUPPLY CONTROL FUNCTION AND CONTROL METHOD

(71) Applicants: BEIJING BOE DISPLAY TECHNOLOGY CO., LTD., Beijing (CN); BOE TECHNOLOGY GROUP CO., LTD., Beijing (CN)

(72) Inventors: Cuilan Huang, Beijing (CN); Yuan Zhang, Beijing (CN); Jieqiong Wang, Beijing (CN); Lei Liu, Beijing (CN); Wei Wang, Beijing (CN); Jianlong Gao, Beijing (CN); Bohao Chen, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/759,614

(22) PCT Filed: Aug. 16, 2021

(86) PCT No.: PCT/CN2021/112655
§ 371 (c)(1),
(2) Date: Jul. 27, 2022

(87) PCT Pub. No.: WO2022/068427
PCT Pub. Date: Apr. 7, 2022

(65) Prior Publication Data
US 2023/0083400 A1   Mar. 16, 2023

(30) Foreign Application Priority Data

Sep. 30, 2020 (CN) .......................... 202011063116.1

(51) Int. Cl.
*G06F 3/041* (2006.01)
*G06F 1/3234* (2019.01)

(52) U.S. Cl.
CPC .......... *G06F 3/0412* (2013.01); *G06F 1/3262* (2013.01)

(58) Field of Classification Search
CPC .... G06F 9/4401; G06F 3/0416; G06F 3/0412; G06F 1/3262; G06F 1/3265; G09G 3/36
See application file for complete search history.

(56) References Cited

U.S. PATENT DOCUMENTS

2013/0147697 A1   6/2013   Sung et al.
2015/0160769 A1   6/2015   Yousefpor et al.
(Continued)

FOREIGN PATENT DOCUMENTS

CN   101763160 A   6/2010
CN   102999216 A   3/2013
(Continued)

OTHER PUBLICATIONS

ISA China National Intellectual Property Administration, International Search Report and Written Opinion Issued in Application No. PCT/CN2021/112655, dated Nov. 19, 2021, WIPO, 15 pages. (Submitted with Partial Translation).

*Primary Examiner* — Yaron Cohen
(74) *Attorney, Agent, or Firm* — McCoy Russell LLP

(57) ABSTRACT

The present disclosure provides a display touch device and a control method. The display touch device includes a display panel, a display touch driving circuit and a touch operation processing circuit, wherein the display panel includes a plurality of gate lines; the touch operation processing circuit is configured to provide a first touch enable signal to the display touch driving circuit when it is detected that the display touch device is in a touch-only detection state, to control the display touch driving circuit to perform (Continued)

touch detection. The present disclosure can conveniently perform touch detection when the display touch device is in the touch-only detection state.

16 Claims, 18 Drawing Sheets

(56) References Cited

U.S. PATENT DOCUMENTS

| | | |
|---|---|---|
| 2015/0269900 A1 | 9/2015 | Iwamoto et al. |
| 2018/0059838 A1* | 3/2018 | Chung ................ G09G 3/3688 |
| 2018/0095576 A1 | 4/2018 | Yokoo et al. |
| 2018/0246607 A1 | 8/2018 | Pai et al. |
| 2019/0094590 A1 | 3/2019 | Aoki et al. |

FOREIGN PATENT DOCUMENTS

| | | | |
|---|---|---|---|
| CN | 103165091 | A | 6/2013 |
| CN | 104718568 | A | 6/2015 |
| CN | 105676500 | A | 6/2016 |
| CN | 106959789 | A | 7/2017 |
| CN | 206532567 | U | 9/2017 |
| CN | 107633832 | A | 1/2018 |
| CN | 108182011 | A | 6/2018 |
| CN | 108762560 | A | 11/2018 |
| IN | 104169859 | A | 11/2014 |
| KR | 20160082878 | A | 7/2016 |
| KR | 20180002395 | A | 1/2018 |
| WO | 2017154657 | A1 | 9/2017 |

* cited by examiner

DISPLAY TOUCH DEVICE WITH POWER SUPPLY CONTROL FUNCTION AND CONTROL METHOD

CROSS-REFERENCE TO RELATED APPLICATION

The present application is a U.S. National Phase of International Application No. PCT/CN2021/112655, entitled "DISPLAY TOUCH DEVICE AND CONTROL METHOD", and filed on Aug. 16, 2021. International Application No. PCT/CN2021/112655 claims priority to Chinese Patent Application No. 202011063116.1 filed on Sep. 30, 2020. The entire contents of the above-listed application are hereby incorporated by reference for all purposes.

TECHNICAL FIELD

The present disclosure relates to the field of display touch technology, and more particularly to a display touch device and a control method.

BACKGROUND

For conventional monitors, when the computer or host is not used for a long time, the system automatically enters the sleep mode, and the display part is turned off to save power consumption. When the mouse is moved or the keyboard is pressed, the system wakes up, and then the screen is turned on. For the in-cell display touch device, it is hoped that the touch function can also be used to wake up the system by tapping the screen. The existing display touch device cannot conveniently wake up the system in the sleep mode by tapping the screen and using the touch function.

SUMMARY

A first aspect of the present disclosure provides a display touch device, includes a display panel, a display touch driving circuit and a touch operation processing circuit, wherein the display panel includes a plurality of gate lines; the touch operation processing circuit is configured to provide a first touch enable signal to the display touch driving circuit when it is detected that the display touch device is in a touch-only detection state, to control the display touch driving circuit to perform touch detection.

Optionally, the display touch device further includes a power supply control circuit, a display power supply terminal, a touch power supply terminal and a power management module; wherein the power management module is configured to supply power to the display touch driving circuit according to a power supply voltage inputted by a voltage input terminal of the power management module; the power supply control circuit is respectively electrically connected to the display power supply terminal, the touch power supply terminal and the power management module, and is configured to control to connect the display power supply terminal and the voltage input terminal when the display power supply terminal provides a display power supply voltage, and is configured to control to connect the touch power supply terminal and the voltage input terminal when the display power supply terminal does not provide the display power supply voltage and the touch power supply terminal provides a touch power supply voltage.

Optionally, the power supply control circuit comprises a voltage dividing sub-circuit, a signal generation sub-circuit and a power supply control sub-circuit; the voltage dividing sub-circuit is electrically connected to the display power supply terminal and the signal generating sub-circuit respectively, and is configured to divide the display power supply voltage when the display power supply terminal provides the display power supply voltage, to generate and output a display working voltage through a display working voltage terminal; the signal generation sub-circuit is electrically connected to the display working voltage terminal and the control signal output terminal respectively, and is configured to generate and output a control signal through the control signal output terminal according to the display working voltage, when the display working voltage is greater than a first predetermined voltage, the control signal is controlled to be a first voltage signal, and when the display working voltage is less than the first predetermined voltage, the control signal is controlled to be a second voltage signal; the power supply control sub-circuit is respectively electrically connected to the control signal output terminal, the display power supply terminal, the touch power supply terminal and the voltage input terminal, and is configured to control to connect the display power supply terminal and the voltage input terminal when the control signal is the first power supply terminal, and control to connect the touch power supply terminal and the voltage input terminal when the control signal is the second voltage signal.

Optionally, the signal generating sub-circuit is integrated in the touch operation processing circuit.

Optionally, the first voltage signal is a low voltage signal, and the second voltage signal is a high voltage signal; or, the first voltage signal is the high voltage signal, the second voltage signal is the low voltage signal.

Optionally, the power supply control sub-circuit comprises a first switch sub-circuit, a second switch sub-circuit, a first inversion sub-circuit and a second inversion sub-circuit; the first inversion sub-circuit is configured to perform phase inversion on the control signal to obtain a first inversion voltage signal, and provide the first inversion voltage signal to a control terminal of the second switch sub-circuit and the second inversion sub-circuit; the second inversion sub-circuit is configured to perform phase inversion on the first inversion voltage signal to obtain a second inversion voltage signal, and provide the second inversion voltage signal to a control terminal of the first switch sub-circuit; the first switch sub-circuit is configured to control to connect the display power supply terminal and the voltage input terminal when the second inversion voltage signal is the first voltage signal, and control to disconnect the display power supply terminal from the voltage input terminal when the second inversion voltage signal is the second voltage signal; the second switch sub-circuit is configured to control to connect the touch power supply terminal and the voltage input terminal when the first inversion voltage signal is the first voltage signal, and control to disconnect the touch power supply terminal from the voltage input terminal when the first inversion voltage signal is the second voltage signal.

Optionally, the first switch sub-circuit includes a first switch transistor and a second switch transistor; both a control electrode of the first switch transistor and a control electrode of the second switch transistor are electrically connected to the control terminal of the first switch sub-circuit; a first electrode of the first switch transistor is electrically connected to the display power supply terminal, and a second electrode of the first switch transistor is electrically connected to a first electrode of the second switch transistor; a second electrode of the second switch transistor is electrically connected to the voltage input terminal.

Optionally, the second switch sub-circuit comprises a third switch transistor; a first electrode of the third switch transistor is electrically connected to the touch power supply terminal, and a second electrode of the third switch transistor is electrically connected to the voltage input terminal.

Optionally, the first inversion sub-circuit includes a first inversion transistor and a first resistor; a control electrode of the first inversion transistor is electrically connected to the control signal output terminal, a first electrode of the first inversion transistor is electrically connected to the control end of the second switch sub-circuit, and a second electrode of the first inversion transistor is electrically connected to a third voltage terminal; a first end of the first resistor is electrically connected to the control end of the second switch sub-circuit, and a second end of the first resistor is electrically connected to the touch power supply terminal.

Optionally, the second inversion sub-circuit includes a second inversion transistor and a second resistor; a control electrode of the second inversion transistor is electrically connected to the control end of the second switch sub-circuit, a first electrode of the second inversion transistor is electrically connected to the touch power supply terminal, and a second electrode of the second inversion transistor is electrically connected to the third voltage terminal through the second resistor.

Optionally, the display touch device further includes a control diode; an anode of the control diode is electrically connected to the display power supply terminal, and a cathode of the control diode is electrically connected to the touch power supply terminal.

Optionally, the display touch device further includes a system terminal, wherein the touch operation processing circuit is further configured to provide a wake-up signal to the system terminal after a touch event on the display panel is detected; the system terminal is configured to control the display touch driving circuit to perform display driving after receiving the wake-up signal.

Optionally, the display touch device further comprises a gate driving module; when the touch operation processing circuit detects that the display touch device is in the touch-only detection state, the touch operation processing circuit provides a discharge control signal to the gate driving module, so that the gate driving module controls the plurality of gate lines to be turned on; after the touch operation processing circuit provides the discharge control signal to the gate driving module, the touch operation processing circuit provides a first touch enable signal to the display touch driving circuit.

Optionally, the display touch device further includes a data driver; wherein the display panel further comprising a plurality of data lines; the touch operation processing circuit is further configured to provide a data driving control signal to the data driver when the discharge control signal is provided to the gate driving module, so that the data driver provides a common electrode voltage signal to the plurality of data lines.

Optionally, the display touch device further includes a timing controller, wherein the timing controller is configured to stop outputting a second touch enable signal to the touch operation processing circuit when the display touch device is in the touch-only detection state; the touch operation processing circuit is configured to determine that the display touch device is in the touch-only detection state when it is detected that the timing controller stops outputting the second touch enable signal.

In a second aspect, an embodiment of the present disclosure provides a control method is applied to the display touch device and includes: when the touch operation processing circuit detects that the display touch device is in the touch-only detection state, providing, by the touch operation processing circuit, the first touch enable signal to the display touch driving circuit to control the display touch driving circuit to perform touch detection.

Optionally, the display touch device further includes a power supply control circuit, a display power supply terminal, a touch power supply terminal and a power management module; the power management module is configured to supply power to the display touch driving circuit according to a power supply inputted by a voltage input terminal of the power management module; the control method further include a power supply control step; the power supply control step includes: when the display power supply terminal provides a display power supply voltage, controlling, by the power supply control circuit, to connect the display power supply terminal and the voltage input terminal; when the display power supply terminal does not provide the display power supply voltage and the touch power supply terminal provides a touch power supply voltage, controlling, by the power supply control circuit, to connect the touch power supply terminal and the voltage input terminal.

Optionally, the power supply control circuit includes a voltage dividing sub-circuit, a signal generation sub-circuit and a power supply control sub-circuit; the power supply control step specifically includes: when the display power supply terminal provides a display power supply voltage, dividing, by the voltage dividing sub-circuit, the display power supply voltage to generate and output a display working voltage through a display working voltage terminal; generating and outputting, by the signal generating sub-circuit respectively, a control signal through the control signal output terminal according to the display working voltage, and when the display working voltage is greater than a first predetermined voltage, controlling, by the signal generating sub-circuit, the control signal to be a first voltage signal, and when the display operating voltage is less than the first predetermined voltage, controlling, by the signal generating sub-circuit, the control signal to be a second voltage signal; when the control signal is the first voltage signal, controlling, by the power supply control sub-circuit, to connect the display power supply terminal and the voltage input terminal, and when the control signal is a second voltage signal, controlling, by the power supply control sub-circuit, to connect the touch power supply terminal and the voltage input terminal.

Optionally, the display touch device further comprises a system terminal; the control method further includes: after the touch operation processing circuit detects a touch event on the display panel, providing, by the touch operation processing circuit, a wake-up signal to system terminal; after the system terminal receives the wake-up signal, controlling, by the system terminal, the display touch driving circuit to perform display driving.

Optionally, the display touch device further comprises a gate driving module; the control method further includes: when the touch operation processing circuit detects that the display touch device is in the touch-only detection state, providing, by the touch operation processing circuit, a discharge control signal to the gate driving module, so that the gate driving module controls the plurality of gate lines to be turned on; after the touch operation processing circuit provides the discharge control signal to the gate driving module, providing, by the touch operation processing circuit, the first touch enable signal to the display touch driving circuit.

Optionally, the display touch device further comprises a data driver, the display panel further comprises a plurality of data lines; the control method further includes: when the touch operation processing circuit provides the discharge control signal to the gate driving module, providing a data driving control signal to the data driver, so that the data driver provides a common electrode voltage signal to the plurality of data lines.

Optionally, the display touch device further comprises a timing controller; the control method further includes: when the display touch device is in the touch-only detection state, stopping, by the timing controller, outputting a second touch enable signal to the touch operation processing circuit; when the touch operation processing circuit detects that the timing controller stops outputting the second touch enable signal, determining, by the touch operation processing circuit, that the display touch device is in the touch-only detection state.

DETAILED DESCRIPTION

Figure 1:
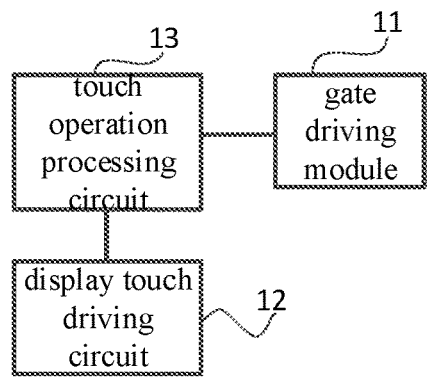
FIG. 1 is a structural diagram of a display touch device according to at least one embodiment of the present disclosure.

The technical solutions in the embodiments of the present disclosure will be clearly and completely described below with reference to the accompanying drawings in the embodiments of the present disclosure. Obviously, the described embodiments are only a part of the embodiments of the present disclosure, but not all of the embodiments. Based on the embodiments in the present disclosure, all other embodiments obtained by those of ordinary skill in the art without creative efforts shall fall within the protection scope of the present disclosure.

The transistors used in all the embodiments of the present disclosure may be triodes, thin film transistors, field effect transistors, or other devices with the same characteristics. In the embodiments of the present disclosure, in order to distinguish the two electrodes of the transistor except the control electrode, one electrode is called the first electrode, and the other electrode is called the second electrode.

In actual operation, when the transistor is a triode, the control electrode may be the base, the first electrode may be the collector, and the second electrode may be the emitter; or the control electrode may be the base electrode, the first electrode can be an emitter, and the second electrode can be a collector.

In actual operation, when the transistor is a thin film transistor or a field effect transistor, the control electrode may be a gate electrode, the first electrode may be a drain electrode, and the second electrode may be a source electrode; or the control electrode may be a gate electrode, the first electrode may be a source electrode, and the second electrode may be a drain electrode.

The display touch device according to the embodiment of the present disclosure includes a display panel, a display touch driving circuit, and a touch operation processing circuit, and the display panel includes a plurality of gate lines;

The touch operation processing circuit is electrically connected to the display touch driving circuit, and is configured to provide a first touch enable signal to the display touch driving circuit when it is detected that the display touch device is in a touch-only detection state, to control the display touch driving circuit to perform touch detection.

When the display touch device according to at least one embodiment of the present disclosure is in operation, the display touch device and the control method according to the embodiment of the present disclosure can conveniently perform touch detection when the display touch device is in a touch-only detection state, so that when the display touch device is in the sleep mode (at this time, the display function of the display touch device is turned off and the power consumption is low), the system can be woken up by using the touch function by clicking on the screen.

In at least one embodiment of the present disclosure, when the display touch device is in a touch-only detection state, the display touch device is in a sleep mode, and the display function of the display touch device is turned off at this time to reduce power consumption.

As shown in FIG. 1, the display touch device according to at least one embodiment of the present disclosure includes a display panel, a gate driving module 11, a display touch driving circuit 12 and a touch operation processing circuit 13, and the display panel includes a plurality of gate lines;

The touch operation processing circuit 13 is electrically connected to the display touch driving circuit 12, and is configured to provide a first touch enable signal to the display touch driving circuit 12 when it is detected that the display touch device is in a touch-only detection state, to control the display touch driving circuit 12 to perform touch detection.

When the display touch device according to at least one embodiment of the present disclosure is in operation, when the touch operation processing circuit 13 detects that the display touch device is in a touch-only detection state, the touch operation processing circuit 13 provides a first touch enable signal to the display touch driving circuit 12 to control the display touch driving circuit 12 to perform touch detection. At least one embodiment of the present disclosure can conveniently perform touch detection when the display touch device is in a touch-only detection state, so as to facilitate the display touch device in a sleep mode (when the display function of the display touch device is turned off, the power consumption is low), to use the touch function to wake up the system by clicking on the screen.

Optionally, in at least one embodiment shown in FIG. 1, the touch operation processing circuit 13 is further electrically connected to the gate driving module 11, so that when it is detected that the display touch device is in a touch-only mode, a discharge control signal is provided to the gate driving module 11, so that the gate driving module 11 controls the plurality of gate lines to be turned on, and after the discharge control signal is provided to the gate driving module 11, a first touch enable signal is provided to the display touch driving circuit 12.

When the display touch device according to at least one embodiment of the present disclosure is in operation, when the touch operation processing circuit 13 detects that the display touch device is in a touch-only detection state, the touch operation processing circuit 13 provides a discharge control signal to the gate driving module 11, to control all gate lines included in the display panel to be turned on for discharging, and then the touch operation processing circuit 13 provides a first touch control signal to the display touch driving circuit 12, to control the display touch driving circuit 12 to perform touch detection, so as to ensure that when the display touch device resumes the display function again, no abnormal display phenomenon (for example, flicker, after-image, etc.) will occur due to inability to discharge.

In at least one embodiment of the present disclosure, when a touch operation processing circuit provides a first touch enable signal to the display touch driving circuit, the touch operation processing circuit can stop providing a discharge control signal to the gate driving module, the gate line is turned off at this time, but not limited to this.

In at least one embodiment of the present disclosure, the display panel may be a liquid crystal display panel, but not limited thereto.

Figure 2:
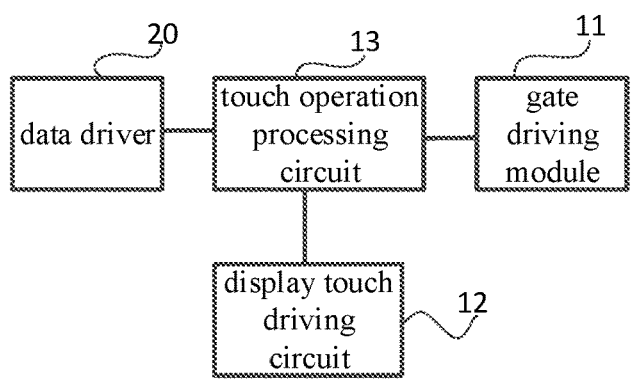
FIG. 2 is a structural diagram of a display touch device according to at least one embodiment of the present disclosure.

During specific implementation, as shown in FIG. 2, the display touch device according to at least one embodiment of the present disclosure further includes a data driver 20, and the display panel further includes a plurality of data lines; the data driver 20 is electrically connected to the data lines, and configured to provide corresponding data voltages to the data lines;

The touch operation processing circuit 13 is also electrically connected to the data driver 20, and is further configured to provide a data driving control signal to the data driver 20 when a discharge control signal is provided to the gate driving module 11, so that the data driver 20 provides a common electrode voltage signal to the data line, so that the potential of the pixel electrode in the pixel circuit included in the display panel is the common electrode voltage, so that when the display touch device resumes the display function again, display abnormality will not occur.

During actual operation, the display touch driving circuit 12 can provide touch driving signals to the touch driving electrodes included in the display panel, and receive touch sensing signals fed back by the touch sensing electrodes included in the display panel. The touch sensing signal is used to determine whether there is a touch event. Wherein, the touch driving electrodes and the touch sensing electrodes may be the same touch electrodes, but not limited thereto. In at least one embodiment of the present disclosure, the common electrodes may be multiplexed as touch electrodes, but not limited thereto.

Figure 3:
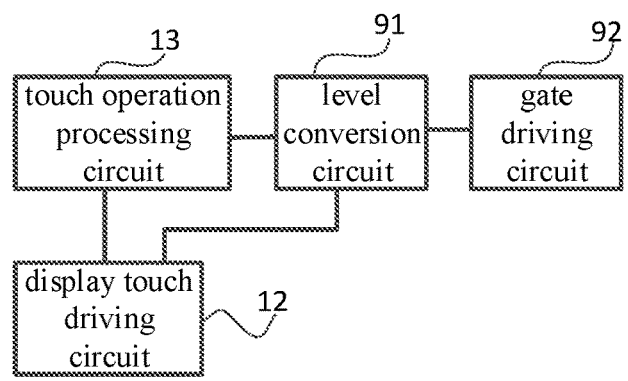
FIG. 3 is a structural diagram of a display touch device according to at least one embodiment of the present disclosure.

In at least one embodiment of the present disclosure, based on at least one embodiment of the display touch device shown in FIG. 1, as shown in FIG. 3, the gate driving module may include a level conversion circuit 91 and a gate driving circuit 92;

The level conversion circuit 91 is electrically connected to the touch operation processing circuit 13 and the display touch driving circuit 12 respectively;

The touch operation processing circuit 13 is configured to provide a discharge control signal to the level conversion circuit 91 when it is detected that the display touch device is in a touch-only detection state;

The level conversion circuit 91 provides a gate line turning-on control signal to the gate driving circuit 92 through the display touch driving circuit 12 according to the discharge control signal, so that the gate driving circuit 92 controls all gate lines included in the display panel to be turned on according to the gate line turning-on control signal.

In actual operation, the gate driving circuit may be arranged on the array substrate included in the display panel, but is not limited thereto.

In at least one embodiment of the present disclosure, when the display panel is a liquid crystal display panel, the display panel may include multiple rows of gate lines, multiple columns of data lines, multiple rows and multiple columns of pixel circuits, and multiple columns of touch signal lines;

The pixel circuit of the mth row and the nth column may include a transistor of the mth row and the nth column and a pixel electrode of the mth row and the nth column; both m and n are positive integers;

The control electrode of the transistor of the mth row and the nth column is electrically connected to the gate line of the mth row, the first electrode of the transistor of the mth row and the nth column is electrically connected to the data line of the nth column, and the second electrode of the transistor of the mth row and the nth column is electrically connected is electrically connected to the pixel electrode of the mth row and the nth column;

The touch signal lines are all electrically connected to the display touch driving circuit 12 and configured to receive touch driving signals from the display touch driving circuit 12 and feedback corresponding touch sensing signals.

In a specific implementation, the turning on of the gate line of the mth row refers to that the gate line of the mth row provides the gate driving signal of the mth row to the control electrode of the transistor of the mth row and the nth column, so that the transistor of the mth row and nth column is turned on, so that the pixel electrode of the mth row and the nth column communicates with the data line of the nth column.

For example, when the transistor of the mth row and the nth column is an n-type transistor, the turning on of the gate line of the mth row refers to that the gate line of the mth row provides a high voltage signal to the control electrode of the transistor of the mth row and the nth column, so that the transistor of the mth row and the nth column is turned on; when the transistor of the mth row and the nth column is a p-type transistor, the turning on of the gate line of the mth row refers to that the gate line of the mth row provides a low voltage signal to the control electrode of the transistor of the mth row and the nth column to turn on the transistor of the mth row and nth column.

Figure 4:
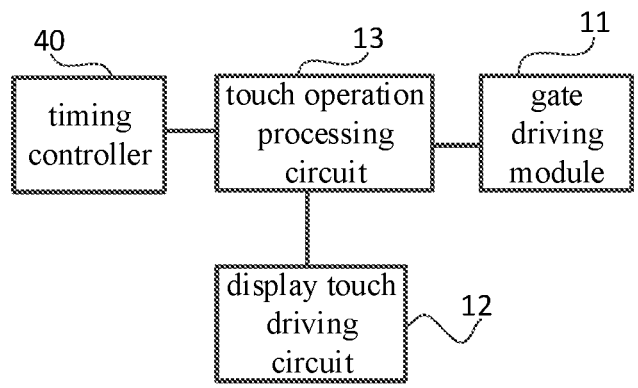
FIG. 4 is a structural diagram of a display touch device according to at least one embodiment of the present disclosure.

In at least one embodiment of the present disclosure, as shown in FIG. 4, on the basis of at least one embodiment of the display touch device shown in FIG. 1, the display touch device may further include a timing controller 40;

The timing controller 40 is configured to stop outputting a second touch enable signal to the touch operation processing circuit 13 when the display touch device is in the touch-only detection state;

The touch operation processing circuit 13 is electrically connected to the timing controller 40, and is configured to determine that the display touch device is in a touch-only detection state when it is detected that the timing controller 40 stops outputting the second touch enable signal.

In actual operation, when the display touch device is in a normal display touch state, the timing controller 40 will provide a second touch enable signal to the touch operation processing circuit 13, and when no front-end display signal is inputted at this time, the display part is turned off and the touch function is retained. At this time, the timing controller 40 does not provide the second touch enable signal to the touch operation processing circuit 13. When the touch operation processing circuit 13 detects that the timing controller 40 stops outputting the second touch enable signal, it can be determined that the display touch device is in a touch-only detection state.

Figure 5:
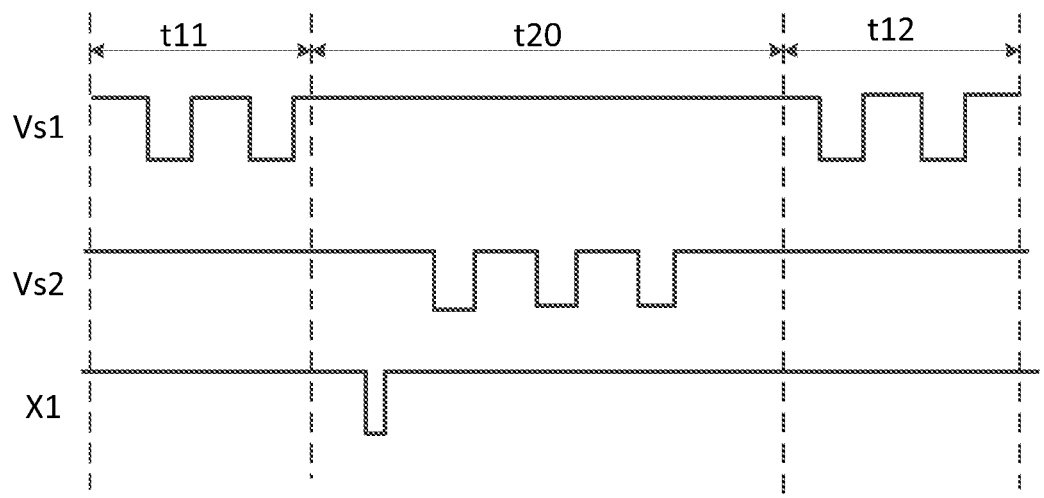
FIG. 5 is a working sequence diagram of the display touch device shown in FIG. 4 of at least one embodiment of the present disclosure.

In at least one embodiment of the present disclosure, the touch operation processing circuit 13 may provide a discharge control signal X1 to the gate driving module, and the touch operation processing circuit 13 may provide the first touch enable signal Vs1 to the display touch driving circuit 12, the timing controller 40 may provide a second touch enable signal Vs2 to the touch operation processing circuit 13; FIG. 5 is a waveform diagram of X1, Vs1 and Vs2.

As shown in FIG. 5, in a first display touch phase t11 and a second display touch phase t12, S2 outputs a second touch enable signal;

At the beginning of a screen-off touch phase t20, the touch operation processing circuit 13 outputs a discharge control signal X1, and then the touch operation processing circuit 13 outputs a first touch enable signal Vs1;

In the screen-off touch phase t20, the display touch device is in the touch-only detection state, no display signal is input at the front end, and only touch detection can be performed.

In FIG. 5, when the potential of the first touch enable signal is a low voltage, the display touch device can perform touch detection, and when the potential of the second touch enable signal is a low voltage, the display touch device can perform touch detection, and when the potential of the discharge control signal is a low voltage, the gate driving module 11 can control the gate lines to be turned on.

In at least one embodiment of the present disclosure, the display touch device may include a touch operation processing circuit, a display touch driving circuit, a Timing Controller (TCON), and a system terminal;

When the display touch device is normally performing touch display, the system terminal provides a display signal to TCON, the display power supply terminal G1 supplies power to TCON, and the touch power supply terminal G2 supplies power to the touch operation processing circuit.

In at least one embodiment of the present disclosure, the system end is a board provided by a complete machine factory with a windows operating system.

When the display touch device according to at least one embodiment of the present disclosure performs touch detection, the display touch driving circuit 12 provides touch driving signals to the touch electrodes through the touch signal lines, and receives the touch sensing signals feedback from the touch signal lines.

Figure 6:
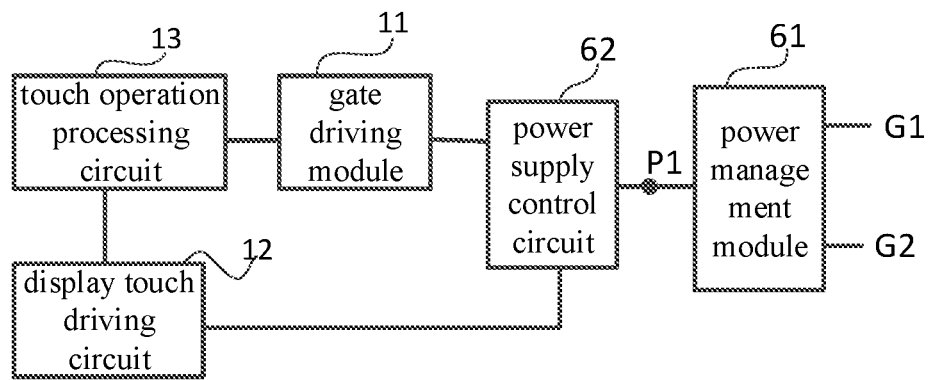
FIG. 6 is a structural diagram of a display touch device according to at least one embodiment of the present disclosure.

In specific implementation, as shown in FIG. 6, on the basis of the display touch device shown in FIG. 1, the display touch device described in at least one embodiment of the present disclosure may further include a power supply control circuit 61, a display power supply terminal G1, a touch power supply terminal G2 and a power management module 62; the power management module 62 is used for supplying power to the gate driving module 11 and the display touch driving circuit 12 according to the power supply voltage inputted by a voltage input terminal P1 of the power management module 62;

The power supply control circuit 61 is respectively electrically connected to the display power supply terminal G1, the touch power supply terminal G2 and the power management module 62, and is configured to control to connect the display power supply terminal G1 and the voltage input terminal P1 when the display power supply terminal G1 provides the display power supply voltage, and is configured to control to connect the touch power supply terminal G2 and the voltage input terminal P1 when the display power supply terminal G1 does not provide a display power supply voltage and the touch power supply terminal G2 provides a touch power supply voltage T.

When the display touch device according to at least one embodiment of the present disclosure is in operation, when the display power supply terminal G1 provides the display power supply voltage, the display power supply terminal G1 supplies power to the gate driving module and the display touch driving circuit 12. When the display power supply terminal G1 does not provide the display power supply voltage and the touch power supply terminal G2 provides the touch power supply voltage, the touch power supply terminal G2 supplies power for the gate driving module and the display touch driving circuit 12, so as to ensure that the display touch device can perform the touch detection operation normally.

During specific implementation, the power management module may include a power management integrated circuit and a touch integrated circuit;

The gate driving module includes a level conversion circuit and a gate driving circuit;

The power management integrated circuit provides a voltage signal for the touch integrated circuit, and the voltage signal may include a low voltage signal VGL and a common electrode voltage signal VCOM, but is not limited thereto;

The touch integrated circuit is used for providing a first modulation voltage signal VCOM_M and a second modulation voltage signal VGL_M to the display touch driving circuit 12;

Wherein, VCOM_M is a voltage signal obtained by superimposing a pulse signal on the basis of VCOM, and VGL_M is a voltage signal obtained by superimposing a pulse signal on the basis of VGL, but not limited thereto.

The power management integrated circuit is also used to provide a working voltage for the display touch driving circuit 12;

the level conversion circuit is respectively electrically connected to the touch operation processing circuit and the display touch driving circuit;

The touch operation processing circuit is configured to provide a discharge control signal to the level conversion circuit when it is detected that the display touch device is in a touch-only detection state;

The level conversion circuit provides a gate line turning-on control signal to the gate driving circuit through the display touch driving circuit according to the discharge control signal, so that the gate driving circuit controls the gate line to be turned on according to the gate line turning-on control signal, to control all gate lines included in the display panel to be turned on.

In actual operation, the gate driving circuit may be arranged on the array substrate included in the display panel, but is not limited thereto.

Figure 7:
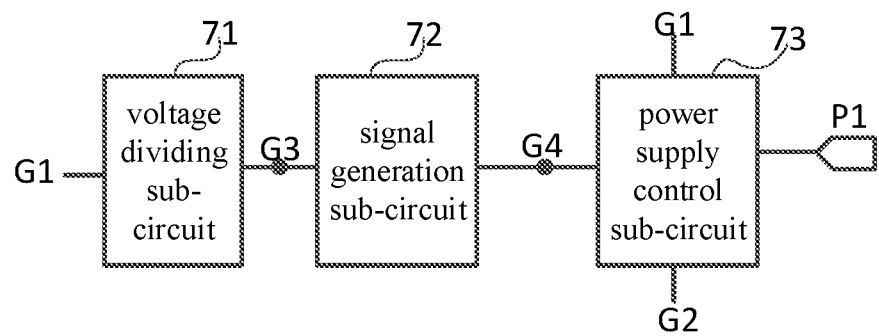
FIG. 7 is a structural diagram of a display touch device according to at least one embodiment of the present disclosure.

As shown in FIG. 7, the power supply control circuit may include a voltage dividing sub-circuit 71, a signal generation sub-circuit 72 and a power supply control sub-circuit 73;

The voltage dividing sub-circuit 71 is electrically connected to the display power supply terminal G1 and the signal generating sub-circuit 72 respectively, and is used to divide the display power supply voltage when the display power supply terminal G1 provides the display power supply voltage, to generate and output the display working voltage through the display working voltage terminal G3;

The signal generation sub-circuit 72 is electrically connected to the display working voltage terminal G3 and the control signal output terminal G4 respectively, and is used for generating and outputting a control signal through the control signal output terminal G4 according to the display working voltage. When the display working voltage is greater than a first predetermined voltage, the control signal is controlled to be a first voltage signal, and when the display working voltage is less than the first predetermined voltage, the control signal is controlled to be a second voltage signal;

The power supply control sub-circuit 73 is respectively electrically connected to the control signal output terminal G4, the display power supply terminal G1, the touch power supply terminal G2 and the voltage input terminal P1, and is used to control to connect the display power supply terminal G1 and the voltage input terminal P1 when the control signal is the first power supply terminal G1, and control to connect the touch power supply terminal G2 and the voltage input terminal P1 when the control signal is a second voltage signal.

When the display touch device of the present disclosure as shown in FIG. 7 is in operation, the voltage dividing sub-circuit 71 divides the display power supply voltage to generate a display working voltage, and the signal generating sub-circuit 72 controls to generate a corresponding control signal according to the display working voltage. The power supply control sub-circuit 73 controls the display voltage terminal G1 to be connected to the voltage input terminal P1 under the control of the control signal, or controls the touch power supply terminal G2 to be connected to the voltage input terminal P1.

During specific implementation, the signal generating sub-circuit may be integrated into the touch operation processing circuit.

Optionally, the first voltage signal is a low voltage signal, and the second voltage signal is a high voltage signal; or, the first voltage signal is a high voltage signal, and the second voltage signal is a low voltage signal.

Figure 8:
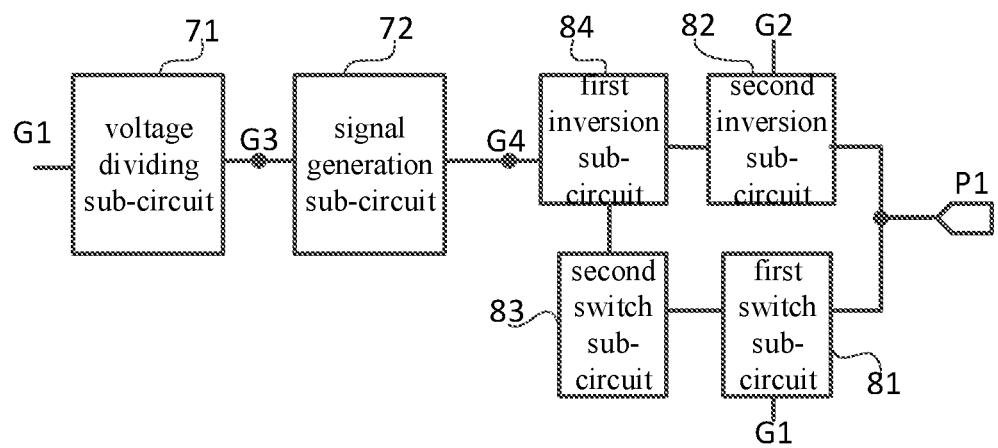
FIG. 8 is a structural diagram of a display touch device according to at least one embodiment of the present disclosure.

In at least one embodiment of the present disclosure, on the basis of at least one embodiment shown in FIG. 7, as shown in FIG. 8, the power supply control sub-circuit may include a first switch sub-circuit 81, a second switch sub-circuit 82, a first inversion sub-circuit 84 and a second inversion sub-circuit 83;

The first inversion sub-circuit 84 is respectively electrically connected to the control signal output terminal G4, the control terminal of the second switch sub-circuit 82 is connected to the second inversion sub-circuit 83, and is used to perform phase inversion for the control signal to obtain a first inversion voltage signal, and provide the first inversion voltage signal to the control terminal of the second switch sub-circuit 82 and the second inversion sub-circuit 83;

The second inversion sub-circuit 83 is electrically connected to the control terminal of the first switch sub-circuit 81, and is used to perform phase inversion for the first inversion voltage signal to obtain a second inversion voltage signal, and provide the second inversion voltage signal to the control terminal of the first switch sub-circuit 81;

The first switch sub-circuit 81 is electrically connected to the display power supply terminal G1 and the voltage input terminal P1 respectively, and is used to control to connect the display power supply terminal G1 and the voltage input terminal P1 when the second inversion voltage signal is the first voltage signal G1, and control to disconnect the display power supply terminal G1 from the voltage input terminal P1 when the second inversion voltage signal is a second voltage signal;

The second switch sub-circuit 82 is electrically connected to the touch power supply terminal G2 and the voltage input terminal P1 respectively, and is used to control to connect the touch power supply terminal G2 and the voltage input terminal P1 when the first inversion voltage signal is the first voltage signal, and control to disconnect the touch power supply terminal G2 from the voltage input terminal P1 when the first inversion voltage signal is the second voltage signal.

In a specific implementation, the power supply control sub-circuit may include a first switch sub-circuit 81, a second switch sub-circuit 82, a first inversion sub-circuit 84 and a second inversion sub-circuit 83; the first inversion sub-circuit 83 performs the phase inversion for the control signal to obtain a first inversion voltage signal, and the second inversion sub-circuit 83 performs phase inversion for the first inversion voltage signal to obtain a second inversion voltage signal; the first switch sub-circuit 81 controls to connect or disconnect the display power supply terminal G1 and the voltage input terminal P1 according to the second inverse voltage signal; the second switch sub-circuit 8 controls to connect or disconnect the touch power supply terminal G2 and the voltage input terminal P1 under the control of the first inversion voltage signal.

Optionally, the first switch sub-circuit includes a first switch transistor and a second switch transistor;

Both the control electrode of the first switch transistor and the control electrode of the second switch transistor are electrically connected to the control terminal of the first switch sub-circuit;

The first electrode of the first switch transistor is electrically connected to the display power supply terminal, and the second terminal of the first switch transistor is electrically connected to the first electrode of the second switch transistor;

The second electrode of the second switch transistor is electrically connected to the voltage input terminal.

Optionally, the second switch sub-circuit includes a third switch transistor;

A first electrode of the third switch transistor is electrically connected to the touch power supply terminal, and a second electrode of the third switch transistor is electrically connected to the voltage input terminal.

Optionally, the first inversion sub-circuit includes a first inversion transistor and a first resistor;

A control electrode of the first inversion transistor is electrically connected to the control signal output end, a first electrode of the first inversion transistor is electrically connected to the control end of the second switch sub-circuit, and a second electrode of the first inversion transistor is electrically connected to the third voltage terminal;

A first end of the first resistor is electrically connected to the control end of the second switch sub-circuit, and a second end of the first resistor is electrically connected to the touch power supply terminal.

Optionally, the second inversion sub-circuit includes a second inversion transistor and a second resistor;

A control electrode of the second inversion transistor is electrically connected to the control end of the second switch sub-circuit, a first electrode of the second inversion transistor is electrically connected to the touch power supply terminal, and a second electrode of the second inversion transistor is electrically connected to the third voltage terminal through the second resistor.

In at least one embodiment of the present disclosure, when the display touch device can perform touch detection, the touch power supply terminal G2 always outputs a touch power supply voltage.

In actual operation, the third voltage terminal may be a ground terminal or a low voltage terminal, but is not limited thereto.

During specific implementation, the display touch device described in at least one embodiment of the present disclosure may further include a control diode;

An anode of the control diode is electrically connected to the display power supply terminal, and a cathode of the control diode is electrically connected to the touch power supply terminal;

The control diode ensures the power supply current of the touch power supply terminal when the display touch device is in normal operation, and simultaneously prevents the current from refilling when the display touch device is in the sleep mode.

When the display touch device according to at least one embodiment of the present disclosure is in the touch-only detection state, the timing controller may not work, and the display touch driving circuit 12 works.

Figure 9:
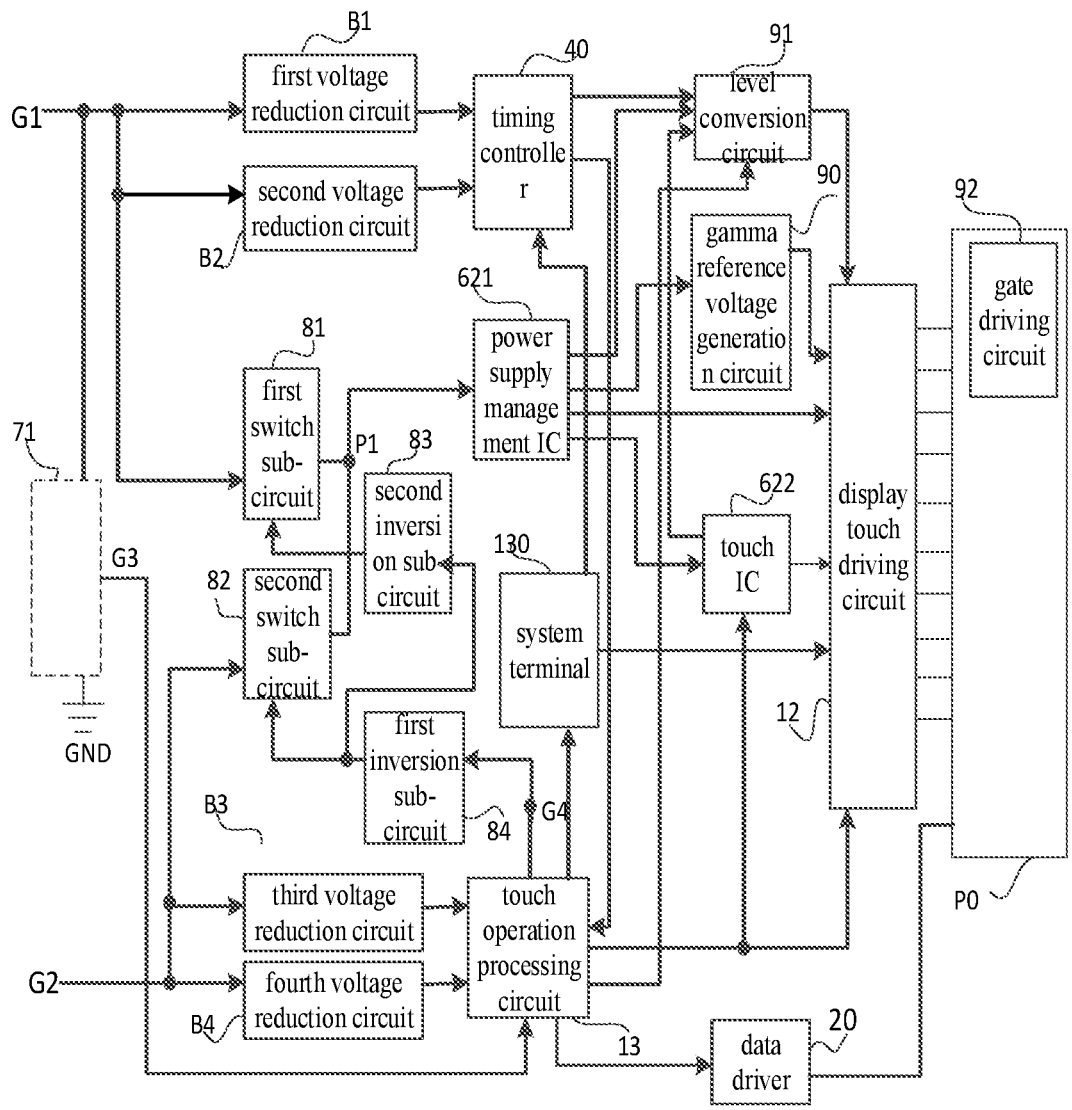
FIG. 9 is a structural diagram of a display touch device according to at least one embodiment of the present disclosure.

As shown in FIG. 9, the display touch device according to at least one embodiment of the present disclosure includes a display panel P0, a gate driving module, a display touch driving circuit 12, a touch operation processing circuit 13, a timing controller 40, a power supply control circuit, a display power supply terminal G1, a touch power supply terminal G2, a power management module, a gamma reference voltage generation circuit 90, a first voltage reduction circuit B1, a second voltage reduction circuit B2, a third voltage reduction circuit B3, a fourth voltage reduction circuit B4, a data driver 20 and a system terminal 130; the display panel P0 includes a plurality of gate lines;

The gate driving module includes a level conversion circuit 91 and a gate driving circuit 92;

The level conversion circuit 91 is electrically connected to the touch operation processing circuit 13 and the display touch driving circuit 12 respectively;

The touch operation processing circuit 13 is configured to provide a discharge control signal to the level conversion circuit 91 when it is detected that the display touch device is in a touch-only detection state;

The level conversion circuit 91 provides a gate line turning-on control signal to the gate driving circuit 92 through the display touch driving circuit 12 according to the discharge control signal, so that the gate driving circuit 92 controls all gate lines included in the display panel to be turned on according to the gate line turning-on control signal;

The gate driving circuit 92 is arranged on the array substrate included in the display panel P0;

The touch operation processing circuit 13 is further configured to provide a driving voltage VDD for the level conversion circuit 91;

The timing controller 40 is electrically connected to the touch operation processing circuit 13; when the display touch device is in a normal display touch state, the timing controller 40 provides a second touch enable signal Vs2 to the touch operation processing circuit 13, the touch operation processing circuit 13 provides Vs2 to the display touch driving circuit 12; and when no front-end display signal is inputted, the display part is turned off, and the touch function is retained. At this time, the timing controller 40 does not provide the second touch enable signal Vs2 to the touch operation processing circuit 13. When the touch operation processing circuit 13 detects that the timing controller 40 stops outputting the second touch enable signal Vs2, it can determine that the display touch device is in a touch-only detection state;

The timing controller 40 is configured to provide a start signal STV, a clock signal CLK and a driving voltage VDD to the level conversion circuit 91;

The touch operation processing circuit 13 is electrically connected to the gate driving module and the display touch driving circuit 12 respectively, and is configured to send a discharge control signal to the gate driving module when it is detected that the display touch device is in a touch-only detection state, so that the gate driving module controls the plurality of gate lines to be turned on, and after providing the discharge control signal to the gate driving module, a first touch enable signal is provided to the display touch driving circuit 12 to control the display touch driving circuit 12 to perform touch detection;

The touch operation processing circuit 13 is also electrically connected to the level conversion circuit 91 for providing a power supply voltage for the level conversion circuit 91;

The display touch driving circuit 12 receives the touch enable signal Vs0; the touch operation processing circuit 13 provides the touch enable signal Vs0 to the touch integrated circuit 622;

The power management module includes the power management integrated circuit 621 and the touch integrated circuit 622;

The power management integrated circuit 621 provides a voltage signal for the touch integrated circuit 622, and the voltage signal may include a low voltage signal VGL and a common electrode voltage signal VCOM;

The touch integrated circuit 622 is used for providing a first modulation voltage signal VCOM_M and a second modulation voltage signal VGL_M to the display touch driving circuit 12; the power management integrated circuit 621 is also used to provide a working voltage to the display touch driving circuit 12;

The touch integrated circuit 622 is used to provide VCOM_M for the display touch driving circuit 12, and the touch integrated circuit 622 is used to provide VGL_M for the level conversion circuit 91;

The power management integrated circuit 621 is used to supply power to the gamma reference voltage generating circuit 90, and the gamma reference voltage generating circuit 90 is electrically connected to the display touch driving circuit 12 to provide the gamma reference voltage to the display touch driving circuit 12;

The power supply control circuit 61 includes a voltage dividing sub-circuit 71, a signal generation sub-circuit and a power supply control sub-circuit;

The voltage dividing sub-circuit 71 includes a first voltage dividing resistor R1 and a second voltage dividing resistor R2, wherein, The first end of R1 is electrically connected to the display power supply terminal G1, the second end of R1 is electrically connected to the first end of R2, and the second end of R2 is electrically connected to the ground terminal GND;

The second end of R1 is electrically connected to the display working voltage terminal G3;

The signal generation sub-circuit is integrated in the touch operation processing circuit 13;

The signal generating sub-circuit is respectively electrically connected to the display working voltage terminal G3 and the control signal output terminal G4, and is configured to generate and output a control signal through the control signal output terminal G4 according to the display working voltage. When the display working voltage is greater than the first predetermined voltage, the control signal is controlled to be the first voltage signal, and when the display working voltage is less than the first predetermined voltage, the control signal is controlled to be the second voltage signal;

The power supply control sub-circuit includes a first switch sub-circuit 81, a second switch sub-circuit 82, a first inversion sub-circuit 84 and a second inversion sub-circuit 83;

The first inversion sub-circuit 84 is respectively electrically connected to the control signal output terminal G4, the control end of the second switch sub-circuit 82 is electrically connected to the second inversion sub-circuit 83, and is used to perform phase conversion on the control signal to obtain a first inversion voltage signal, and provide the first inversion voltage signal to the control end of the second switch sub-circuit 82 and the second inversion sub-circuit 83;

The second inversion sub-circuit 83 is electrically connected to the control end of the first switch sub-circuit 81, and is used to perform phase inversion on the first inversion voltage signal to obtain a second inversion voltage signal, and provide the second inversion voltage signal to the control end of the first switch sub-circuit 81;

The first switch sub-circuit 81 is electrically connected to the display power supply terminal G1 and the voltage input terminal P1 respectively, and is used to control to connect the display power supply terminal G1 and the voltage input terminal P1 when the second inversion voltage signal is the first voltage signal G1, and control to disconnect the display power supply terminal G1 from the voltage input terminal P1 when the second inversion voltage signal is a second voltage signal;

The second switch sub-circuit 82 is electrically connected to the touch power supply terminal G2 and the voltage input terminal P2 respectively, and is used to control to connect the touch power supply terminal G2 and the voltage input terminal P1 when the first inversion voltage signal is the first voltage signal, and control to disconnect the touch power supply terminal G2 and the voltage input terminal P1 when the first inversion voltage signal is the second voltage signal;

The first voltage reduction circuit B1 is electrically connected to the display power supply terminal G1 and the timing controller 40, respectively, and is used to reduce the display power supply voltage and provide the reduced display power supply voltage to the timer controller 40;

The second voltage reduction circuit B2 is electrically connected to the display power supply terminal G1 and the timing controller 40 respectively, and is used to reduce the display power supply voltage and provide the reduced display power supply voltage to the timing controller 40;

The third voltage reduction circuit B3 is electrically connected to the touch power supply terminal G2 and the touch operation processing circuit 13 respectively, and is used to reduce the touch power supply voltage and provide the reduced touch power supply voltage to the touch operation processing circuit 13;

The fourth voltage reduction circuit B4 is electrically connected to the touch power supply terminal G2 and the touch operation processing circuit 13 respectively, and is used to reduce the touch power supply voltage and provide the reduced touch power supply voltage to the touch operation processing circuit 13;

The data driver 20 is electrically connected to the data lines included in the display panel P0, and is used to provide corresponding data voltages for the data lines;

The touch operation processing circuit 13 is also electrically connected to the data driver 20, is configured to provide a data driving control signal to the data driver 20 when a discharge control signal is provided to the level conversion circuit 91, so that the data driver 20 provides a common electrode voltage signal to the data line;

The system terminal 130 is electrically connected to the timing controller 40, and is used to provide a display signal to the timing controller 40 when the display touch device normally performs touch display;

The system terminal 130 is further electrically connected to the touch operation processing circuit 13 and the display touch driving circuit 12, respectively.

The touch operation processing circuit 13 is further configured to provide a wake-up signal to the system terminal 130 after detecting a touch event on the display panel;

The system terminal 130 is configured to control the display touch driving circuit 12 to perform display driving after receiving the wake-up signal.

In at least one embodiment of the display touch device shown in FIG. 9 of the present disclosure, the first voltage reduction circuit B1, the second voltage reduction circuit B2, the third voltage reduction circuit B3 and the fourth voltage reduction circuit B4 all include a single-channel voltage reduction IC. Therefore, two voltage reduction circuits need to be used between the display power supply terminal G1 and the timing controller 40, and two voltage reduction circuits need to be used between the touch power supply terminal G2 and the touch operation processing circuit 13. When the voltage reduction circuit adopts a multi-channel voltage reduction IC, only one voltage reduction circuit can be used in the display power supply terminal G1 and the timing controller 40, and only one voltage reduction circuit can be used between the touch power supply terminal G2 and the touch operation processing circuit 13.

When the display touch device according to at least one embodiment of the present disclosure is in operation, the first inversion sub-circuit 84 performs phase inversion on the control signal to obtain a first inversion voltage signal; the second inversion sub-circuit 84 performs phase inversion on the first inversion voltage signal to obtain a second inversion voltage signal; the first switch sub-circuit 81 is used to control to connect the display power supply terminal G1 and the voltage input terminal P1 when the second inversion voltage signal is a low voltage signal, and control to disconnect the display power supply terminal G1 from the voltage input terminal P1 when the second inversion voltage signal is a high voltage signal. The second switch sub-circuit 82 is used to control to connect the touch power supply terminal G2 and the voltage input terminal P1 when the first inversion voltage signal is a low voltage signal, and control to disconnect the touch power supply terminal G2 from the voltage input terminal P1 when the first inversion voltage signal is a high voltage signal;

When G1 provides the display power supply voltage, the control signal is a low voltage signal, the first inversion voltage signal is a high voltage signal, the second inversion voltage signal is a low voltage signal, and the second switch sub-circuit 82 controls to disconnect the touch power supply terminal G2 from the voltage input terminal P1, the first switch sub-circuit 81 controls to connect the display power supply terminal G1 and the voltage input terminal P1;

When G1 does not provide the display power supply voltage, the control signal is a high voltage signal; the first inversion voltage signal is a low voltage signal, the second inversion voltage signal is a high voltage signal, and the second switch sub-circuit 82 controls to connect the touch power supply terminal G2 and the voltage input terminal P1, the first switch sub-circuit 81 controls to disconnect the display power supply terminal G1 from the voltage input terminal P1.

Figure 10:
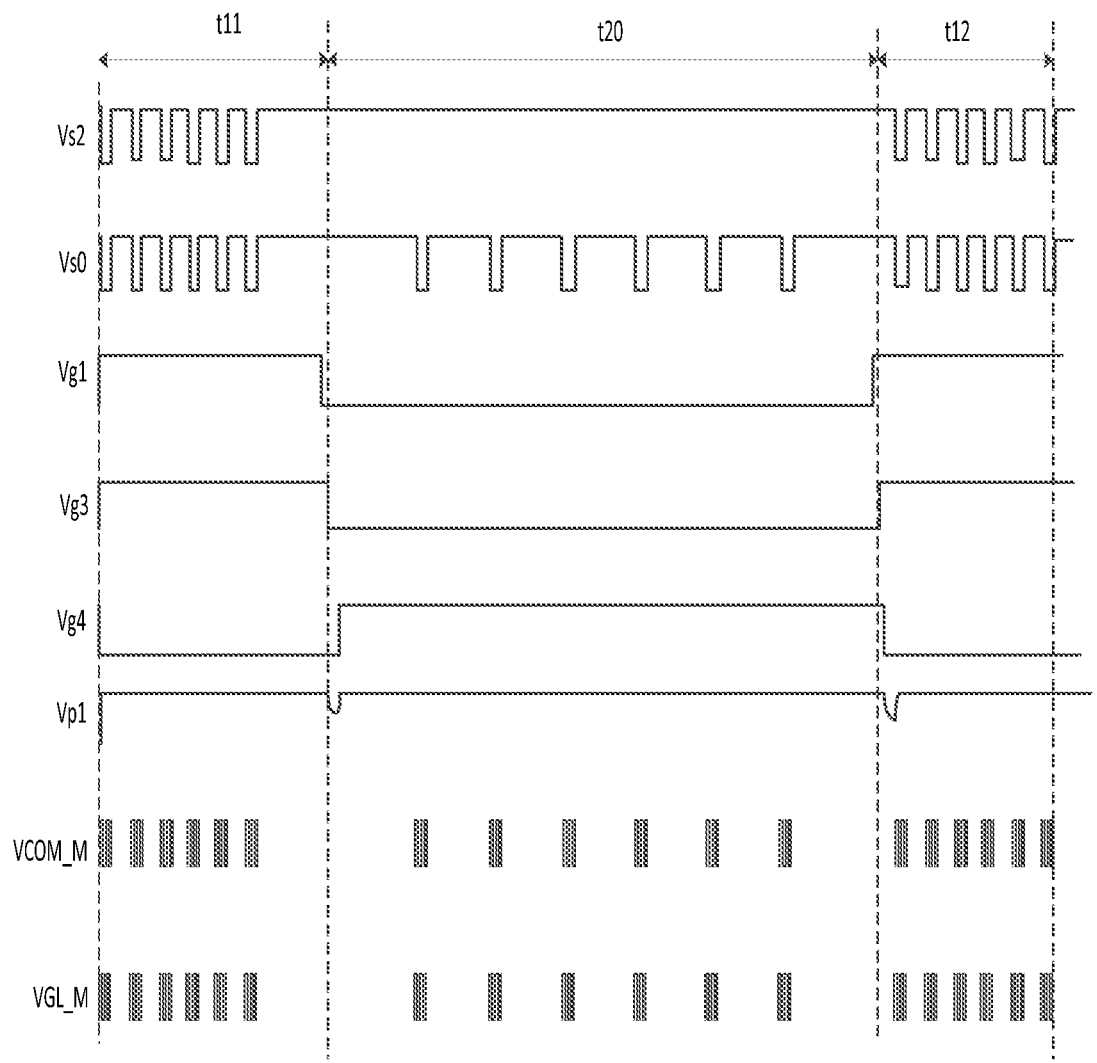
FIG. 10 is a working sequence diagram of the display touch device shown in FIG. 9 of at least one embodiment of the present disclosure.

FIG. 10 is a working timing diagram of the display touch device shown in FIG. 9.

In FIG. 10, the first display touch phase t11 and the second display touch phase t12 are normal working time phases. During the normal working time phases, the display touch device is in a normal display touch state, and the display touch device can perform detection and touch detection; the screen-off touch phase t20 is a touch-only detection phase, and in the touch-only detection time phase, the display touch device is in a touch-only detection state; at t11 and t12, the timing controller works, and at t20, the timing controller may not work, but not limited thereto.

In FIG. 10, Vs2 is the second touch enable signal, Vs0 is the touch enable signal received by the display touch driving circuit 12, and Vg1 is the display power supply voltage provided by G1, Vg3 is the display working voltage outputted by the display working voltage terminal G3, Vg4 is the control signal outputted by the control signal end G4, Vp1 is the potential of P1, VCOM_M is the first modulation voltage signal, VGL_M is the second modulation voltage signal.

Figure 11:
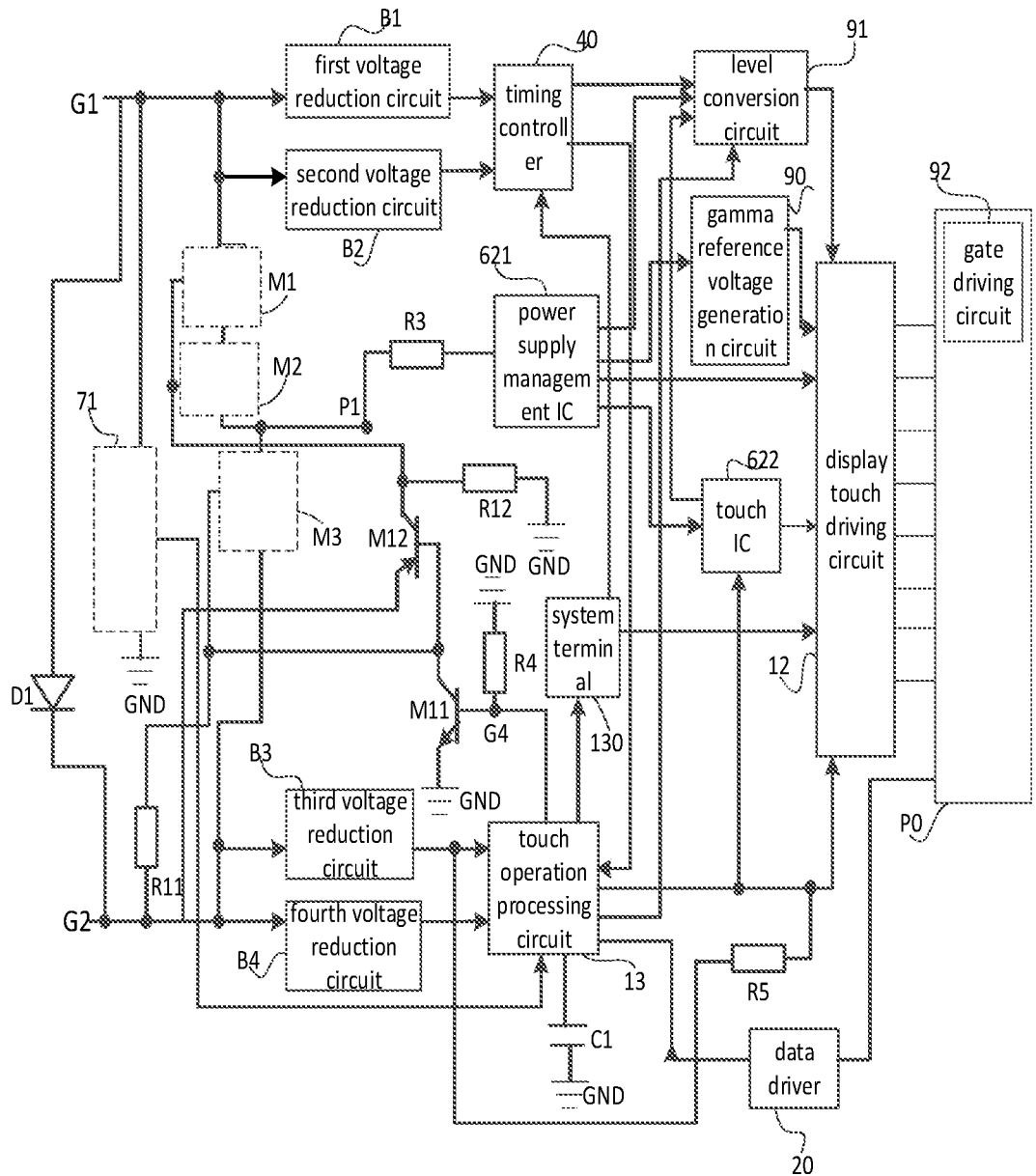
FIG. 11 is a structural diagram of a display touch device according to at least one embodiment of the present disclosure.

As shown in FIG. 11, on the basis of the display touch device described in at least one embodiment of the present disclosure, the display touch device further includes a control diode D1, a third resistor R3, a fourth resistor R4, a fifth resistor R5 and a first capacitor C1;

R3 is connected between the voltage input terminal P1 and the power management integrated circuit 621;

The first end of R4 is electrically connected to the control signal output end G4, and the second end of R4 is electrically connected to the ground terminal GND;

The first end of R5 is electrically connected to the third voltage reduction circuit B3 (the first end of R5 is electrically connected to the terminal of B3 that provides the reduced touch supply voltage, and B3 provides the reduced touch supply voltage through this terminal to the touch operation processing circuit 13), and the second end of R5 is electrically connected to the display touch driving circuit 12;

The first terminal of C1 is electrically connected to the touch operation processing circuit 13, and the second terminal of C1 is connected to the ground terminal GND;

The anode of D1 is electrically connected to the display power supply terminal G1, and the cathode of D1 is electrically connected to the touch power supply terminal G2;

The first switch sub-circuit includes a first switch transistor M1 and a second switch transistor M2; the second switch sub-circuit includes a third switch transistor M3; the first inversion sub-circuit includes a first inversion transistor M11 and a first resistor R11; the second inversion sub-circuit includes a second inversion transistor M12 and a second resistor R12;

The base of the first inversion transistor M11 is electrically connected to the control signal output terminal G4, the collector of the first inversion transistor M11 is electrically connected to the gate electrode of M3, and the emitter of the first inversion transistor M11 is electrically connected to the ground terminal GND;

The first end of the first resistor R11 is electrically connected to the gate electrode of M3, and the second end of the first resistor R11 is electrically connected to the touch power supply terminal G2;

The base of the second inversion transistor M12 is electrically connected to the gate electrode of M3, the emitter of the second inversion transistor M12 is electrically connected to the touch power supply terminal G2, and the collector of the second inversion transistor M12 is electrically connected to the ground terminal GND through the second resistor R12;

The gate electrode of the first switch transistor M1 and the gate electrode of the second switch transistor M2 are both electrically connected to the collector of M12;

The drain electrode of the first switch transistor M1 is electrically connected to the display power supply terminal G1, and the source electrode of the first switch transistor M1 is electrically connected to the source electrode of the second switch transistor M2;

The drain electrode of the second switch transistor M2 is electrically connected to the voltage input terminal P1;

The source electrode of the third switch transistor M3 is electrically connected to the touch power supply terminal G2, and the drain electrode of the third switch transistor M3 is electrically connected to the voltage input terminal P1;

M1, M2 and M3 are all PMOS transistors (P-type metal-oxide-semiconductor transistors), M11 is an npn-type triode, and M12 is a pnp-type triode, but not limited thereto.

In at least one embodiment of the present disclosure, M11 and M12 may be Bipolar Junction Transistor (BJT), but not limited thereto.

When the display touch device according to at least one embodiment of the present disclosure as shown in FIG. 11 is working, When G1 provides the display power supply voltage, the control signal is a low voltage signal, the first inversion voltage signal is a high voltage signal, the second inversion voltage signal is a low voltage signal, M11 is turned off, and the potential of the gate electrode of M3 is a high voltage, M3 is turned off, and P1 and G2 are disconnected; M12 is turned off, the potential of the gate electrode of M1 is a low voltage, M1 and M2 are both turned on, and P1 is connected to G1;

When G1 does not provide the display power supply voltage and G2 provides the touch power supply voltage, the control signal is a high voltage signal; the first inversion voltage signal is a low voltage signal, the second inversion voltage signal is a high voltage signal, M11 is turned on, the potential of M3 is a low voltage, M3 is turned on, and P1 is connected to G2; M12 is turned on, the potential of the gate electrode of M1 is a high voltage, M1 and M2 are turned off, and P1 and G1 are disconnected.

Figure 12:
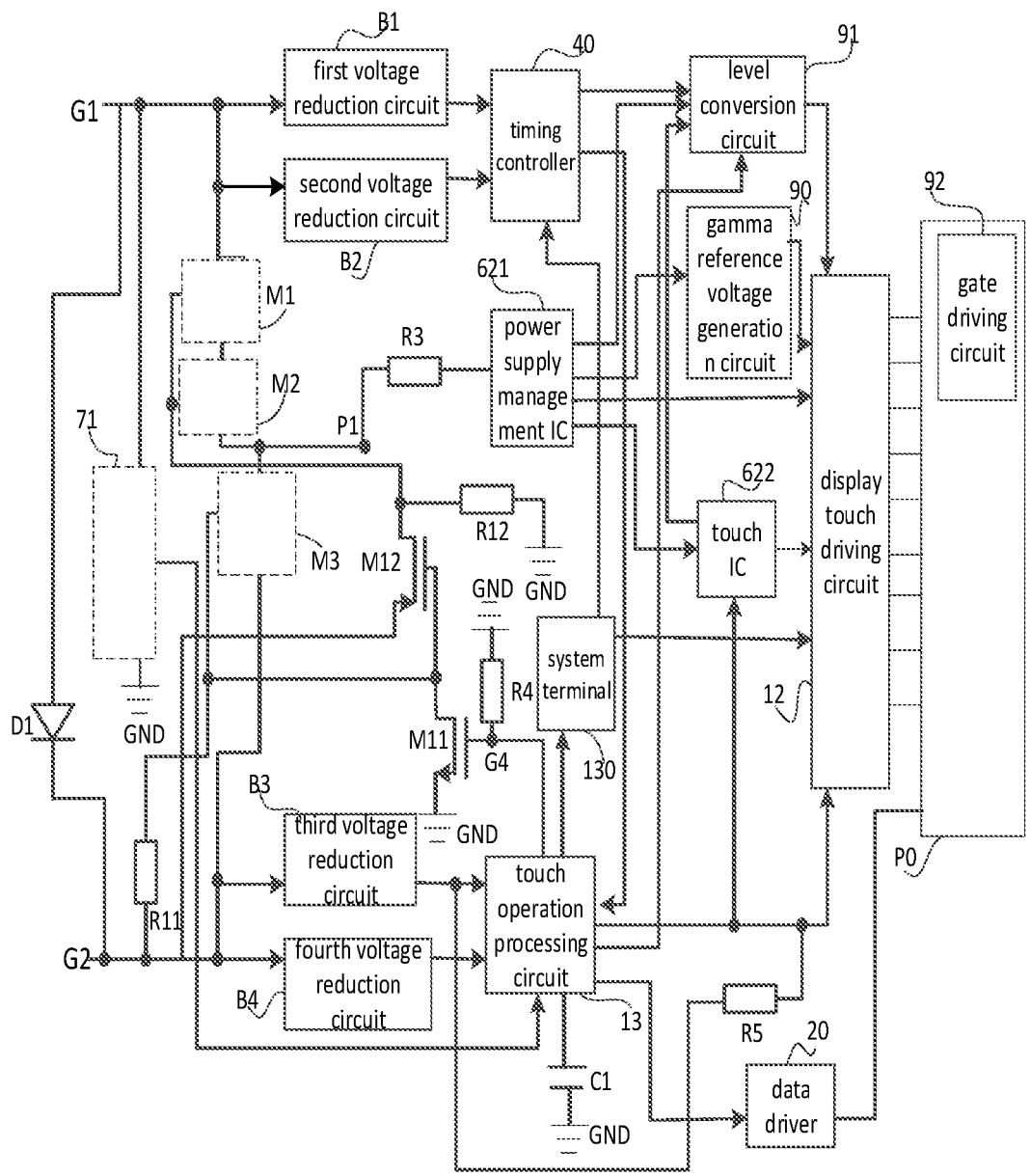
FIG. 12 is a structural diagram of a display touch device according to at least one embodiment of the present disclosure.

As shown in FIG. 12, on the basis of the display touch device shown in FIG. 9 of at least one embodiment of the present disclosure, the display touch device according to at least one embodiment of the present disclosure further includes a control diode D1, a third resistor R3, a fourth resistor R4, a fifth resistor R5 and a first capacitor C1;

The anode of D1 is electrically connected to the display power supply terminal G1, and the cathode of D1 is electrically connected to the touch power supply terminal G2;

The first switch sub-circuit 81 includes a first switch transistor M1 and a second switch transistor M2; the second switch sub-circuit 82 includes a third switch transistor M3; the first inversion sub-circuit 84 includes a first inversion transistor M11 and a first resistor R11; the second inversion sub-circuit 83 includes a second inversion transistor M12 and a second resistor R12;

The gate electrode of the first inversion transistor M11 is electrically connected to the control signal output terminal G4, the drain electrode of the first inversion transistor M11 is electrically connected to the gate electrode of M3, and the source electrode of the first inversion transistor M11 is electrically connected to the ground terminal GND;

The first end of the first resistor R11 is electrically connected to the gate electrode of M3, and the second end of the first resistor R11 is electrically connected to the touch power supply end G2;

The gate electrode of the second inversion transistor M12 is electrically connected to the gate electrode of M3, the source electrode of the second inversion transistor M12 is electrically connected to the touch power supply terminal G2, and the drain electrode of the second inversion transistor M12 is electrically connected to the ground terminal GND through the second resistor R12;

The gate electrode of the first switch transistor M1 and the gate electrode of the second switch transistor M2 are both electrically connected to the collector of M12;

The drain electrode of the first switch transistor M1 is electrically connected to the display power supply terminal G1, and the source electrode of the first switch transistor M1 is electrically connected to the source electrode of the second switch transistor M2;

The drain electrode of the second switch transistor M2 is electrically connected to the voltage input terminal P1;

The source electrode of the third switch transistor M3 is electrically connected to the touch power supply terminal G2, and the drain electrode of the third switch transistor M3 is electrically connected to the voltage input terminal P1;

M1, M2 and M3 are all PMOS transistors (P-type metal-oxide-semiconductor transistors), M11 is an NMOS transistor (N-type metal-oxide-semiconductor transistors), and M12 is a PMOS transistor, but not limited thereto.

When the display touch device shown in FIG. 12 of at least one embodiment of the present disclosure works, When G1 provides the display power supply voltage, the control signal is a low voltage signal, the first inversion voltage signal is a high voltage signal, the second inversion voltage signal is a low voltage signal, M11 is turned off, and the potential of the gate electrode of M3 is a high voltage, M3 is turned off, and P1 and G2 are disconnected; M12 is turned off, the potential of the gate electrode of M1 is a low voltage, M1 and M2 are both turned on, and P1 and G1 are connected;

When G1 does not provide the display power supply voltage and G2 provides the touch power supply voltage, the control signal is a high voltage signal; the first inversion voltage signal is a low voltage signal, the second inversion voltage signal is a high voltage signal, M11 is turned on, the potential of M3 is a low voltage, M3 is turned on, and P1 is connected to G2; M12 is turned on, the potential of the gate electrode of M1 is a high voltage, M1 and M2 are turned off, and P1 and G1 are disconnected.

In at least one embodiment of the present disclosure, the display touch device may further include a system terminal;

The touch operation processing circuit is further configured to provide a wake-up signal to the system terminal after a touch event on the display panel is detected;

The system terminal is configured to control the display touch driving circuit to perform display driving after receiving the wake-up signal.

During specific implementation, the display touch device according to at least one embodiment of the present disclosure may further include a system terminal, and when the display touch device is in a touch-only detection state, after the display panel is touched, the touch operation processing circuit sends a wake-up signal to the system terminal, and the system terminal controls the display touch driving circuit to perform display driving, so that the display touch device returns to a normal display touch state.

Figure 13:
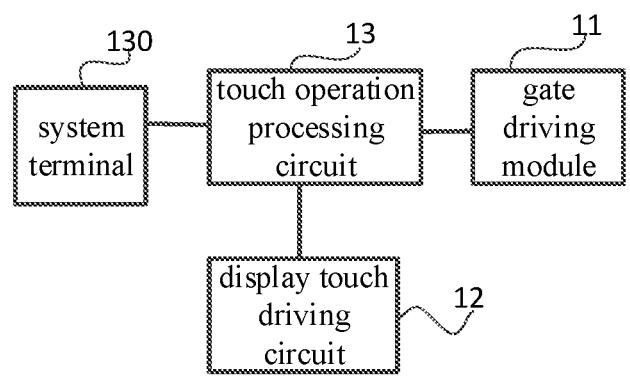
FIG. 13 is a structural diagram of a display touch device according to at least one embodiment of the present disclosure.

As shown in FIG. 13, on the basis of the display touch device shown in FIG. 1, the display touch device may further include a system terminal 130;

The touch operation processing circuit 13 is electrically connected to the system terminal 130, and is further configured to provide a wake-up signal to the system terminal 130 after a touch event on the display panel is detected;

The system terminal 130 is configured to control the display touch driving circuit 12 to perform display driving after receiving the wake-up signal.

When the display touch device is in the touch-only detection state, when the touch power supply terminal supplies power to the driving circuit, when the display panel is touched, the system terminal can be woken up by the touch power supply voltage and the display resumes.

FIGS. 14A, 14B, 14C, and 14D are circuit diagrams of a voltage reduction circuit in a display touch device according to at least one embodiment of the present disclosure. The voltage reduction circuit shown in FIG. 14A, FIG. 14B, FIG. 14C, and FIG. 14D adopts a single-path voltage reduction IC.

Figure 14A:
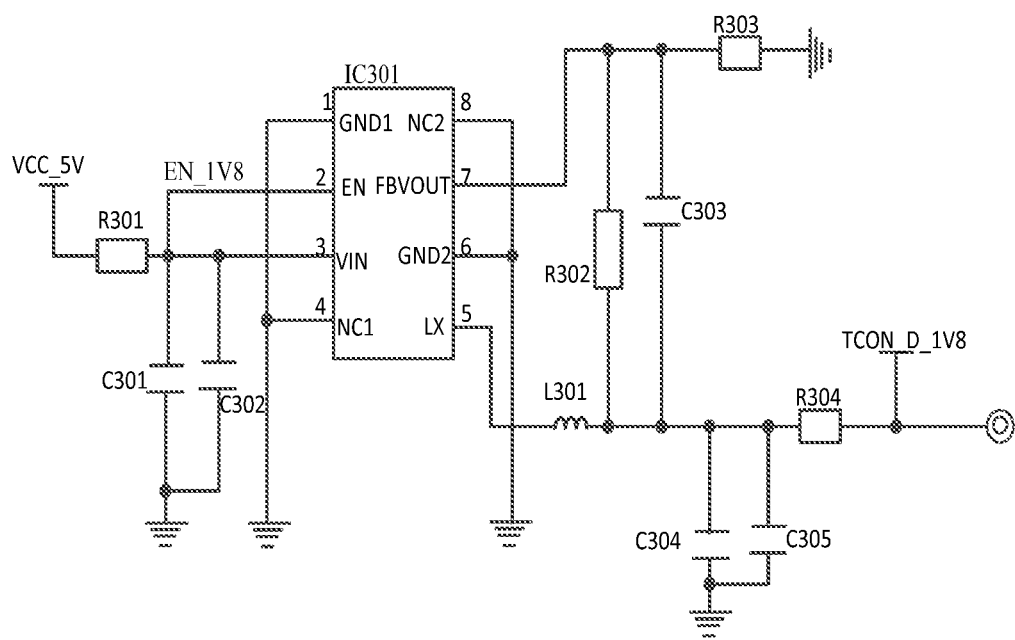
FIGS. 14A, 14B, 14C and 14D are circuit diagrams of a voltage reduction circuit in a display touch device according to at least one embodiment of the present disclosure.

The voltage reduction circuit shown in FIG. 14A includes a first voltage reduction integrated circuit IC301, a first voltage reduction resistor R301, a second voltage reduction resistor R302, a third voltage reduction resistor R03, a fourth voltage reduction resistor R304, a first voltage reduction capacitor C301, a second voltage reduction capacitor C302, a third voltage reduction capacitor C303, a fourth voltage reduction capacitor C304, a fifth voltage reduction capacitor C305 and a first voltage reduction inductor L301;

The first to eighth pins of IC301 are respectively: GND1 pin, EN pin, VIN pin, NC1 pin, LX pin, GND2 pin, FBVOUT pin, NC2 pin;

The first end of R301 is electrically connected to the first working voltage terminal VCC_5V, and the second end of R301 is electrically connected to the VIN terminal of IC301;

C301 is connected in parallel with C302; R302 is connected in parallel with C303, and R303 is electrically connected between the FBVOUT pin of IC301 and the ground terminal;

C304 is connected in parallel with C305, L301 is electrically connected to the LX pin of IC301, the first terminal of R304 is electrically connected to L301, and the second terminal of R304 is electrically connected to the first voltage output terminal TCON_D_1V8;

In at least one embodiment of FIG. 14A, EN_1V8 is the first enable terminal.

Figure 14B:
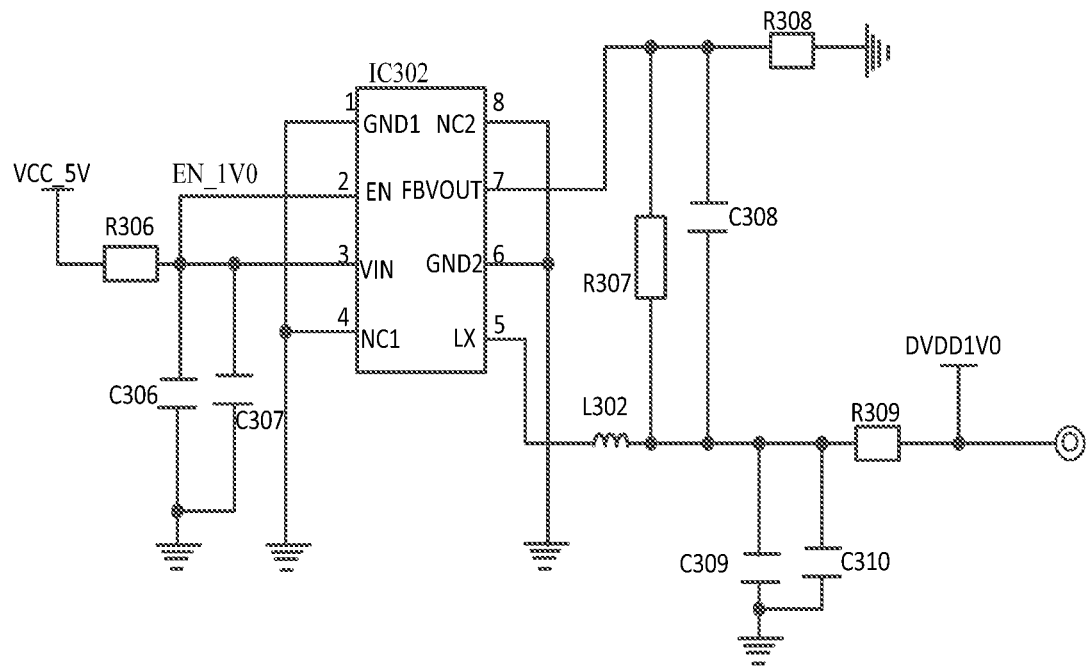

The voltage reduction circuit shown in FIG. 14B includes a second voltage reduction integrated circuit IC302, a fifth voltage reduction resistor R306, a sixth voltage reduction resistor R307, a seventh voltage reduction resistor R08, an eighth voltage reduction resistor R309, a sixth voltage reduction capacitor C306, a seventh voltage reduction capacitor C307, an eighth voltage reduction capacitor C308, a ninth voltage reduction capacitor C309, a tenth voltage reduction capacitor C310 and a second voltage reduction inductor L302;

The first to eighth pins of IC302 are respectively: GND1 pin, EN pin, VIN pin, NC1 pin, LX pin, GND2 pin, FBVOUT pin, NC2 pin;

The first end of R306 is electrically connected to the first working voltage terminal VCC_5V, and the second end of R306 is electrically connected to the VIN terminal of IC302;

C306 is connected in parallel with C307; R307 is connected in parallel with C308, and R308 is electrically connected between the FBVOUT pin of IC302 and the ground terminal;

C309 is connected in parallel with C310, L302 is electrically connected to the LX pin of IC302, the first end of R309 is electrically connected to L302, and the second end of R309 is electrically connected to the second voltage output terminal DVDD1V0;

In at least one embodiment of FIG. 14B, EN_IVO is the second enable terminal.

Figure 14C:
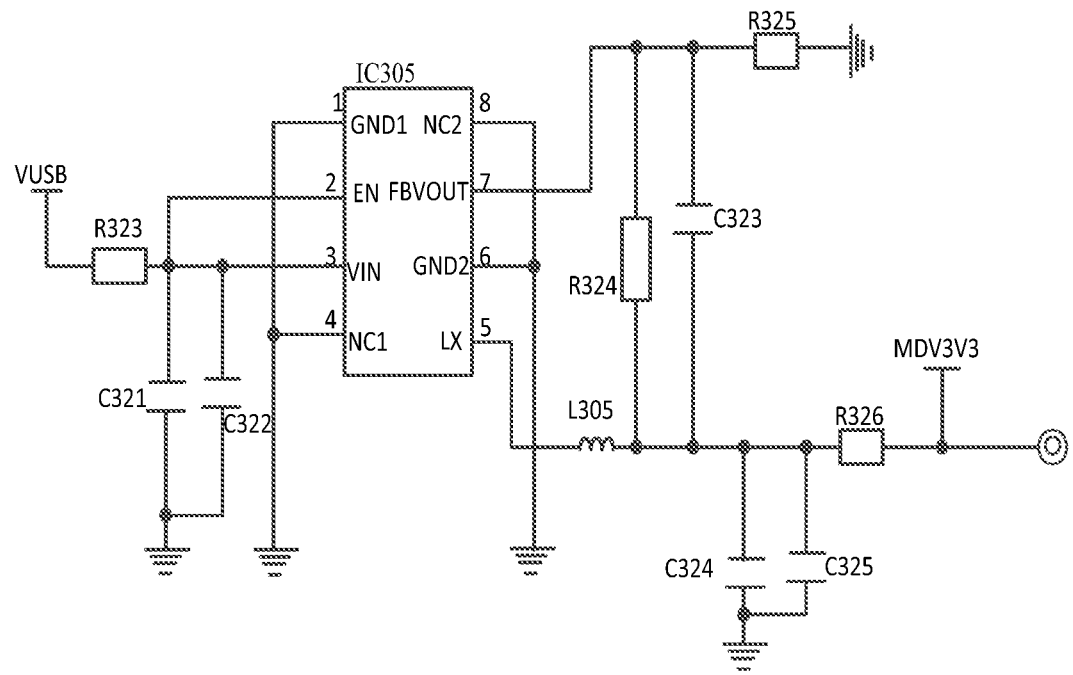

The voltage reduction circuit shown in FIG. 14C includes a third voltage reduction integrated circuit IC305, a ninth voltage reduction resistor R323, a tenth voltage reduction resistor R324, an eleventh voltage reduction resistor R25, a twelfth voltage reduction resistor R326, an eleventh voltage reduction capacitor C321, a twelfth voltage reduction capacitor C322, a thirteenth voltage reduction capacitor C323, a fourteenth voltage reduction capacitor C324, a fifteenth voltage reduction capacitor C325 and a third voltage reduction inductor L305;

The first to eighth pins of IC305 are: GND1 pin, EN pin, VIN pin, NC1 pin, LX pin, GND2 pin, FBVOUT pin, NC2 pin;

The first end of R323 is electrically connected to the second working voltage terminal VUSB, and the second end of R323 is electrically connected to the VIN terminal of IC305;

C321 is connected in parallel with C322; R324 is connected in parallel with C323, and R325 is electrically connected between the FBVOUT pin of IC305 and the ground terminal;

C324 is connected in parallel with C325, L305 is electrically connected to the LX pin of IC305, the first end of R326 is electrically connected to L305, and the second end of R326 is electrically connected to the third voltage output terminal MDV3V3.

Figure 14D:
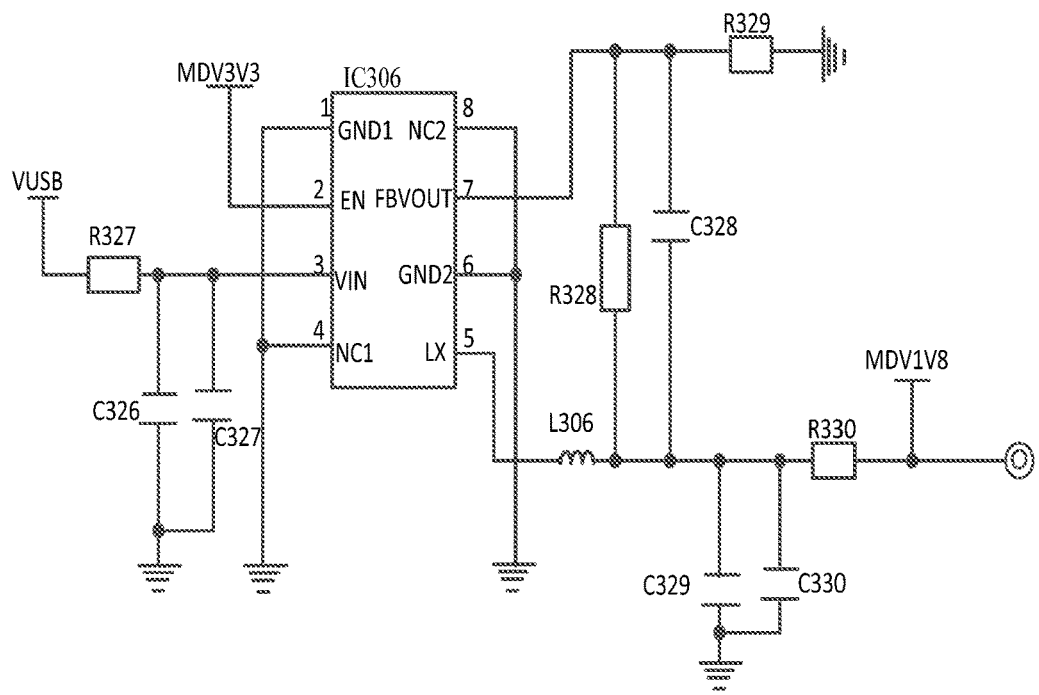

The voltage reduction circuit shown in FIG. 14D includes a fourth voltage reduction integrated circuit IC306, a thirteenth voltage reduction resistor R327, a fourteenth voltage reduction resistor R328, a fifteenth voltage reduction resistor R29, a sixteenth voltage reduction resistor R330, a sixteenth voltage reduction capacitor C326, a seventeenth voltage reduction capacitor C327, an eighteenth voltage reduction capacitor C328, a nineteenth voltage reduction capacitor C329, a twentieth voltage reduction capacitor C330 and a fourth voltage reduction inductor L306;

The first to eighth pins of IC306 are respectively: GND1 pin, EN pin, VIN pin, NC1 pin, LX pin, GND2 pin, FBVOUT pin, NC2 pin;

The first end of R327 is electrically connected to the second working voltage terminal VUSB, and the second end of R327 is electrically connected to the VIN terminal of IC306;

C326 is connected in parallel with C327; R328 is connected in parallel with C328, and R329 is electrically connected between the FBVOUT pin of IC306 and the ground terminal;

C329 is connected in parallel with C330, L306 is electrically connected to the LX pin of IC306, the first end of R330 is electrically connected to L306, and the second end of R330 is electrically connected to the fourth voltage output terminal MDV1V8;

In FIG. 14D, the third working voltage terminal is labeled MDV3V3.

Figure 15:
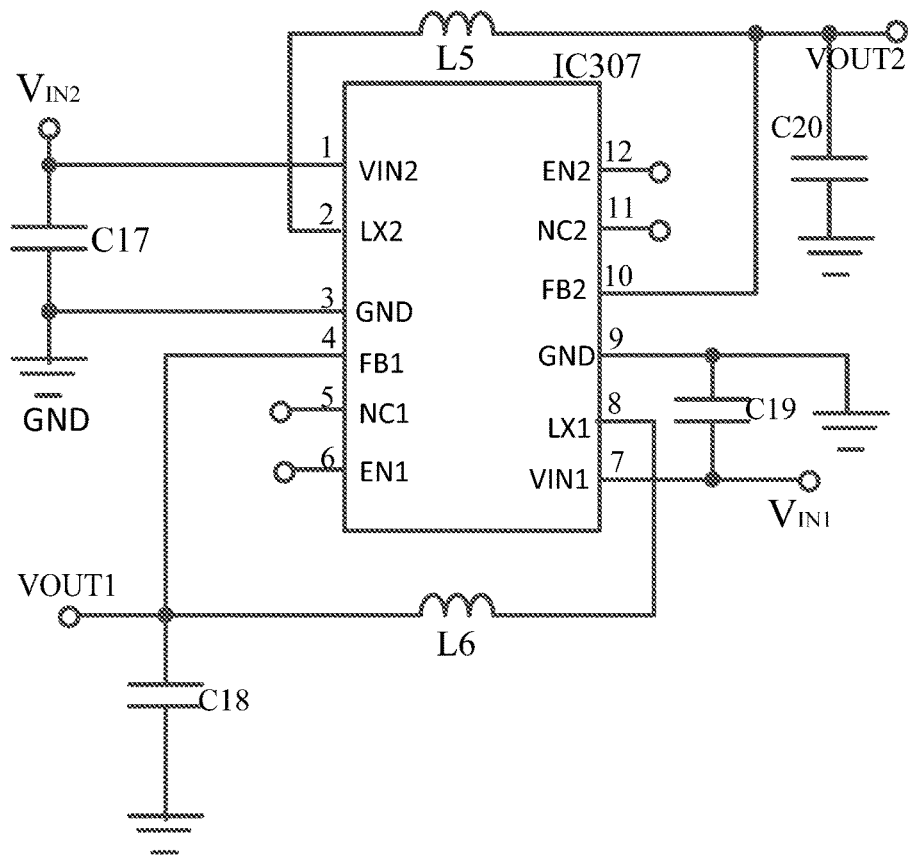
FIG. 15 is a circuit diagram of a voltage reduction circuit in a display touch device according to at least one embodiment of the present disclosure.

FIG. 15 is a circuit diagram of a voltage reduction circuit in a display touch device according to at least one embodiment of the present disclosure. In the voltage reduction circuit shown in FIG. 15, the fifth voltage reduction integrated circuit IC307 may be a DC conversion chip with a model of RT8020, but is not limited thereto.

In the voltage reduction circuit shown in FIG. 15, IC 307 is a multi-path voltage reduction integrated circuit.

The voltage reduction circuit shown in FIG. 15 includes a fifth voltage reduction integrated circuit IC307, a seventeenth capacitor C17, an eighteenth capacitor C18, a nineteenth capacitor C19, a twentieth capacitor C20, a fifth inductor L5 and a sixth inductor L6;

The first to twelfth pins of IC307 are respectively: VIN2 pin, LX2 pin, GND pin, FB1 pin, NC1 pin, EN1 pin, VIN1 pin, LX1 pin, GND pin, FB2 pin, NC2 pin, EN2 pin;

The first voltage input terminal $V_{IN1}$ is electrically connected to the VIN1 pin of IC307;

C17 is electrically connected between the voltage input terminal VIN and the ground terminal GND, and the second voltage input terminal VIN2 is electrically connected to the VIN2 pin of IC307;

The first end of L6 is electrically connected to the first terminal of C18 and the fifth voltage output terminal VOUT1;

The second end of L6 is electrically connected to the LX1 pin of IC307, and the second end of C18 is electrically connected to the ground terminal;

The first end of L5 is electrically connected to the LX2 pin of IC307, and the second end of L5 is electrically connected to the sixth voltage output terminal VOUT2;

The first end of C19 is electrically connected to the ninth pin of IC307, and the second end of C19 is electrically connected to the VIN1 pin of IC307;

The first end of C20 is electrically connected to VOUT2, and the second end of C20 is electrically connected to the ground terminal.

Figure 16A:
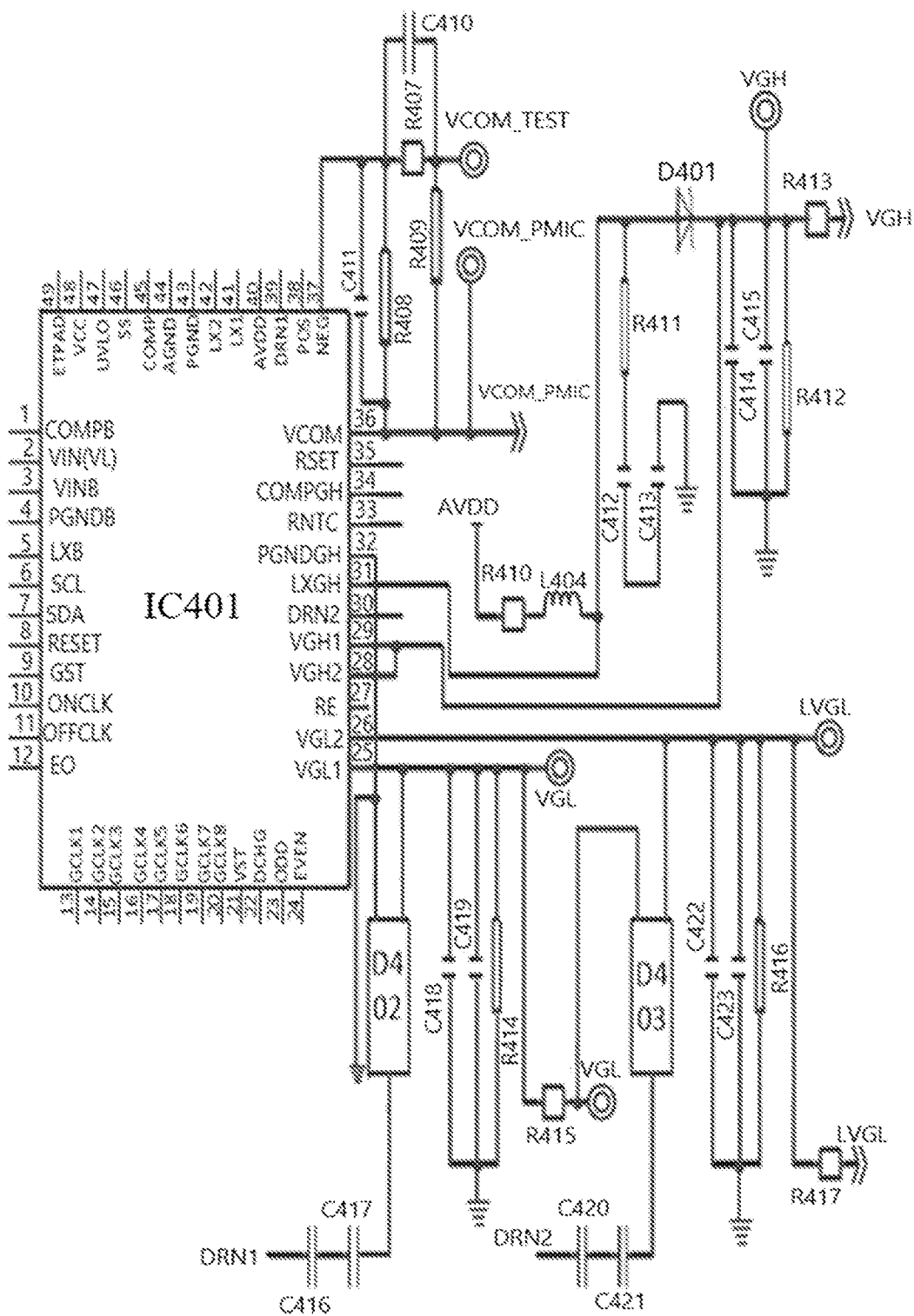
FIG. 16A is a circuit diagram of a portion of a power management integrated circuit in a display touch device according to at least one embodiment of the present disclosure.
Figure 16B:
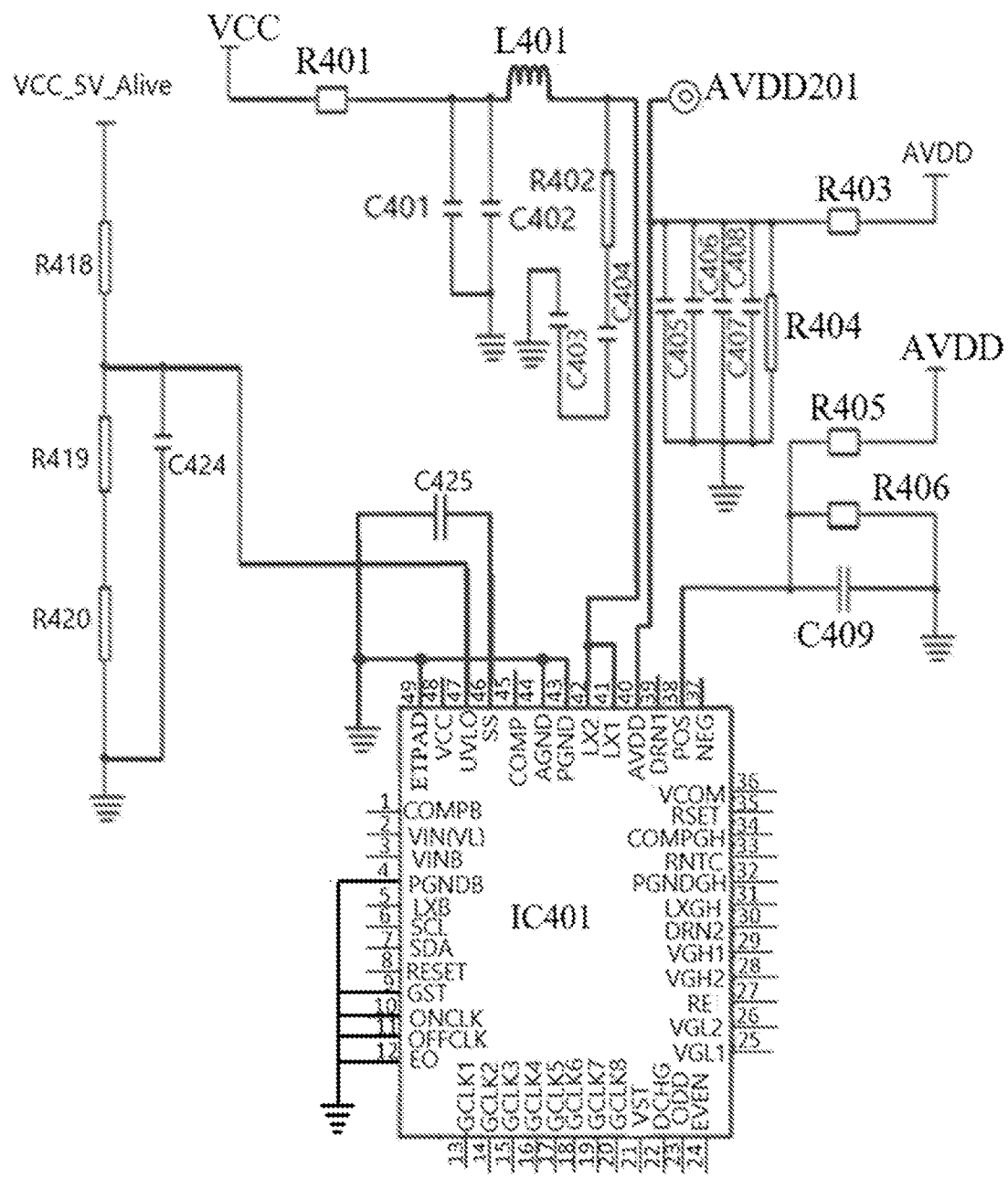
FIG. 16B is a circuit diagram of a portion of a power management integrated circuit in a display touch device according to at least one embodiment of the present disclosure.
Figure 16C:
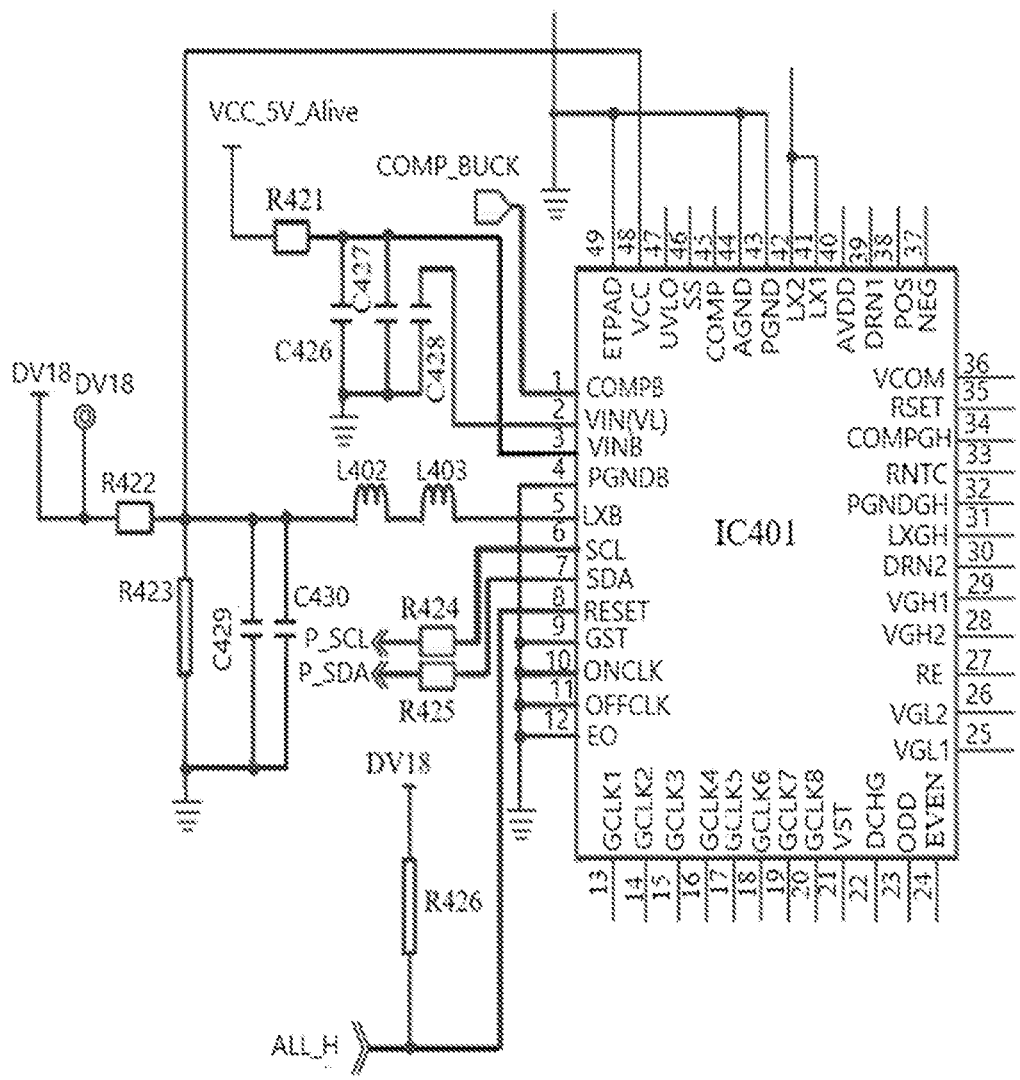
FIG. 16C is a circuit diagram of a portion of a power management integrated circuit in a display touch device according to at least one embodiment of the present disclosure.

FIG. 16A is a circuit diagram of a part of a power management integrated circuit in a display touch device according to at least one embodiment of the present disclosure, FIG. 16B is a circuit diagram of a part of a power management integrated circuit in a display touch device according to at least one embodiment of the present disclosure, FIG. 16C is a circuit diagram of a part of the power management integrated circuit in the display touch device according to at least one embodiment of the present disclosure, and FIG. 16A, FIG. 16B and FIG. 16C form a complete power management integrated circuit.

As shown in FIG. 16A, FIG. 16B and FIG. 16C, the power management integrated circuit adopts a PMIC (Power Management IC) IC401;

The first to forty-ninth pins of IC401 are respectively: COMPB pin, VIN(VL) pin, VINB pin, PGNDB pin, LXB pin, LXB pin, SCL pin, SDA pin, RESET pin, GST pin, ONCLK pin, OFFCLK pin, EO pin, CLK1 pin, CLK2 pin, CLK3 pin, CLK4 pin, CLK5 pin, CLK6 pin, CLK7 pin, CLK8 pin, VST pin, DCHG pin, ODD pin, EVEN pin, VGL1 pin, VGL2 pin, RE pin, VGH2 pin, VGH1 pin, DRN2 pin, LXGH pin, PGNDGH pin, RNTC pin, COMPGH pin, RSET pin, VOM pin, REG pin, POS pin, DRN1 pin, AVDD pin, LX1 pin, LX2 pin, PGND pin, AGND pin, COMP pin, SS pin, UVLO pin, VCC pin, ET PAD pin.

As shown in FIG. 16A, FIG. 16B and FIG. 16C, the power management integrated circuit includes a first control resistor R401, a second control resistor R402, a third control resistor R403, a fourth control resistor R404, a fifth control resistor R405, a sixth control resistor R406, a seventh control resistor R407, an eighth control resistor R408, a ninth control resistor R409, a tenth control resistor R410, an eleventh control resistor R411, a twelfth control resistor R412, a thirteenth control resistor R413, a fourteenth control resistor R414, a fifteenth control resistor R415, a sixteenth control resistor R416, a seventeenth control resistor R417, an eighteenth control resistor R418, a nineteenth control resistor R419, a twentieth control resistor R420, a twenty-first control resistor R421, a twenty-second control resistor R422, a twenty-third control resistor R423, a twenty-fourth control resistor R424, a twenty-fifth control resistor R425, a twenty-sixth control resistor R426, a first control capacitor C401, a second control capacitor C402, a third control capacitor C403, a fourth control capacitor C404, a fifth control capacitor C405, a sixth control capacitor C406, a seventh control capacitor C407, an eighth control capacitor C408, a ninth control capacitor C409, a tenth control capacitor C410, an eleventh control capacitor C411, a twelfth control capacitor C412, a thirteenth control capacitor C413, a fourteenth control capacitor C414, a fifteenth control capacitor C415, a sixteenth control capacitor C416, a seventeenth control capacitor C417, an eighteenth control capacitor C418, a nineteenth control capacitor C419, a twentieth control capacitor C420, a twenty-first control capacitor C421, a twenty-second control capacitor C422, a twenty-third control capacitor C423, a twenty-fourth control capacitor C424, a twenty-fifth control capacitor C425, a twenty-sixth control capacitor C426, a twenty-seventh control capacitor C427, a twenty-eighth control capacitor C428, a twenty-ninth Control capacitor C429, a thirtieth control capacitor C430, a first diode D401, a second diode D402, a third diode D403, a first control inductor L402, a second control inductor L403 and third control inductor L404;

D402 and D403 are double bridge diodes;

C410 is connected in parallel with R407, C411 is connected in parallel with R408, and R409 is connected between the VCOM pin of IC401 and the common electrode test terminal VCOM_TEST;

C411 is connected between the VCOM pin of IC401 and the NEG pin of IC401;

The VCOM pin of IC401 is connected to the power management common electrode voltage terminal VCOM_PMIC;

The first end of R410 is electrically connected to the fourth working voltage terminal AVDD, the second end of R410 is electrically connected to the first end of L404, the second end of L404 is electrically connected to the anode of D401, and the first end of R413 is electrically connected to the cathode of D401, the second end of R413 is connected to the high voltage signal VGH;

C414, C415 and R412 are connected in parallel, and R411, C412 and C413 are connected in series;

C418, CR19 and R414 are connected in parallel with each other; the first end of R414 is electrically connected to the ground terminal, and the second end of R414 is connected to the low-voltage signal VGL;

C422, C423 and R416 are connected in parallel with each other; the first end of R417 and the second end of R417 are both electrically connected to the fifth working voltage end LVGL, and the first end of R415 and the second end of R415 are both connected to VGL;

C416 and C417 are connected in series with each other, and C420 and C421 are connected in series with each other;

The first pin of D402 is electrically connected to the VGL1 pin of IC401, the second pin of D402 is electrically connected to the ground terminal, and the third pin of D402 is electrically connected to C417;

The first pin of D403 is electrically connected to the fifth working voltage terminal LVGL, the second pin of D403 is connected to the low voltage signal VGL, and the third pin of D403 is electrically connected to C421;

C416 is electrically connected to the DRN1 pin of IC401, and C420 is electrically connected to the DRN2 pin of IC401;

C401 is connected in series with C402, the first end of R401 is electrically connected to the sixth working voltage terminal VCC, the second end of R401 is electrically connected to the first end of L401, and the second end of L402 is electrically connected to R402, C404 and C403 which are connected in series with each other; C405, C406, C407, CR08 and R404 are connected in parallel with each other, the first end of R404 is electrically connected to the first end of R403, the first end of R403 is electrically connected to the seventh working voltage terminal AVDD201, the second end of R403 is electrically connected to the fourth working voltage terminal AVDD; AVDD201 is electrically connected to the AVDD pin of IC401; C409 is connected in parallel with R406, the first end of C409 is electrically connected to the POS pin of IC401, and the second end of C409 is electrically connected to the ground terminal; the first end of R405 is electrically connected to the first end of C409, and the second end of R405 is electrically connected to the fourth working voltage terminal AVDD;

R418, R419 and R420 are connected in series with each other, the first end of R418 is electrically connected to the eighth working voltage terminal VCC_5V_Alive, the second end of R418 is electrically connected to R419, the first end of C424 is electrically connected to the second end of R418, and the second end of C424 is grounded;

The first end of C425 is electrically connected to the COMP pin of IC401, and the second end of C425 is grounded;

The first end of R422 is electrically connected to the ninth working voltage terminal DV18;

R423, C429 and C430 are connected in parallel with each other, the first end of R423 is electrically connected to the second end of R422, and the second end of R423 is grounded;

L402 is connected in series with L403, L402 is electrically connected to the second end of R422, and L403 is electrically connected to the LCB pin of IC402;

The first end of R421 is electrically connected to the eighth working voltage terminal VCC_5V_Alive, the second end of R421 is electrically connected to the COMPB pin of IC401, C426 and C427 are connected in parallel; the first end of C426 is grounded, and the second end of C426 is connected to VINB pin of IC401;

The first end of C428 is grounded, and the second end of C428 is electrically connected to the VIN (VL) pin of IC401;

The first end of R424 is electrically connected to the first control terminal P_SCL, and the second end of R424 is electrically connected to the SCL pin of IC401;

The first end of R425 is electrically connected to the second control terminal P_SDA, and the second end of R425 is electrically connected to the SDA pin of IC401;

The first end of R426 is electrically connected to the third control terminal ALL_H, and the second end of R426 is electrically connected to the ninth working voltage terminal DV18;

The COMPB pin of IC401 is electrically connected to the tenth working voltage terminal COMP_BUCK.

Figure 16D:
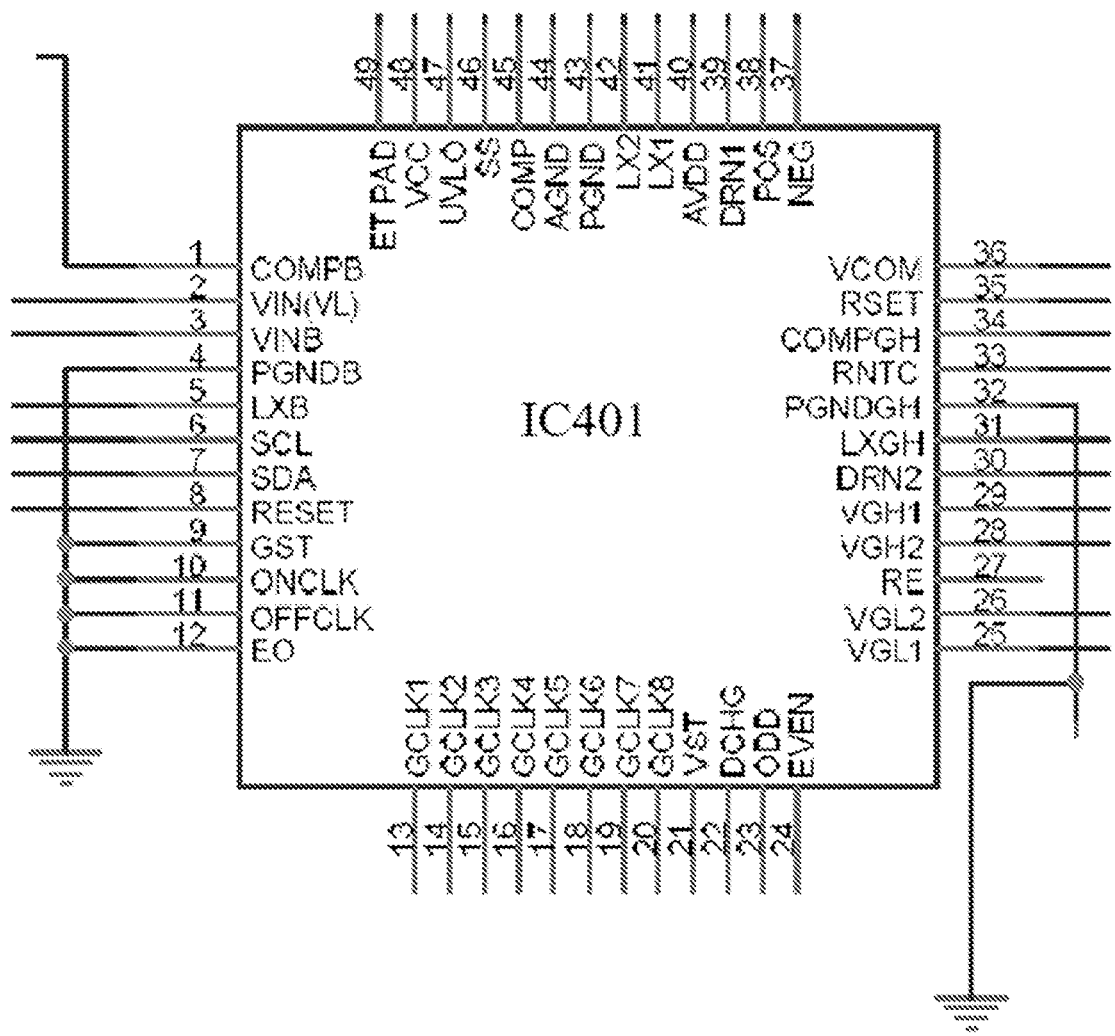
FIG. 16D is a schematic structural diagram of IC 401 in FIGS. 16A, 16B and 16C.

FIG. 16D is a schematic structural diagram of the IC 401 in FIGS. 16A, 16B and 16C.

Figure 17A:
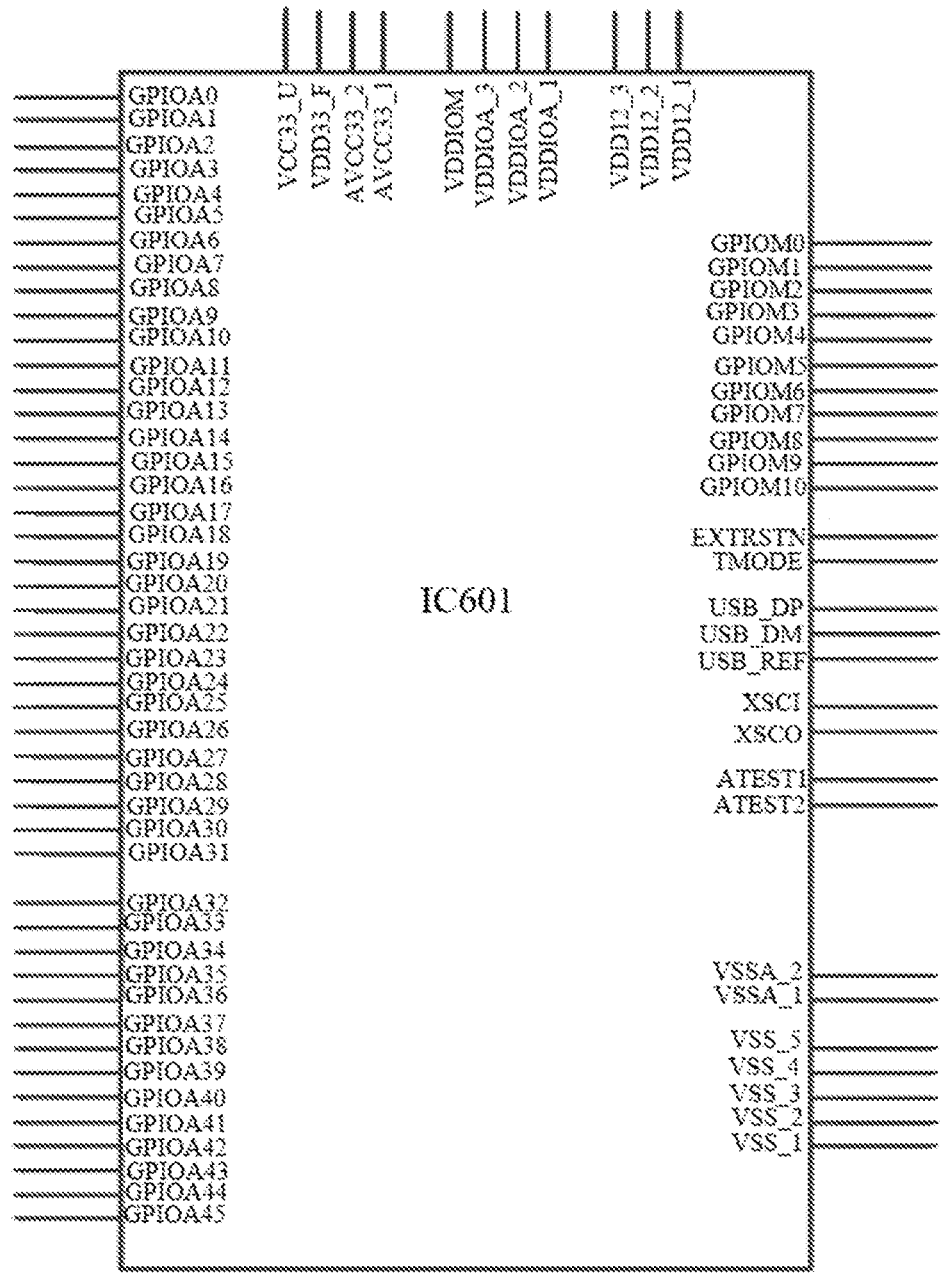
FIG. 17A is a structural diagram of a Micro Control Unit (MCU) chip IC601 used in the touch operation processing circuit in the display touch device according to at least one embodiment of the present disclosure.
Figure 17B:
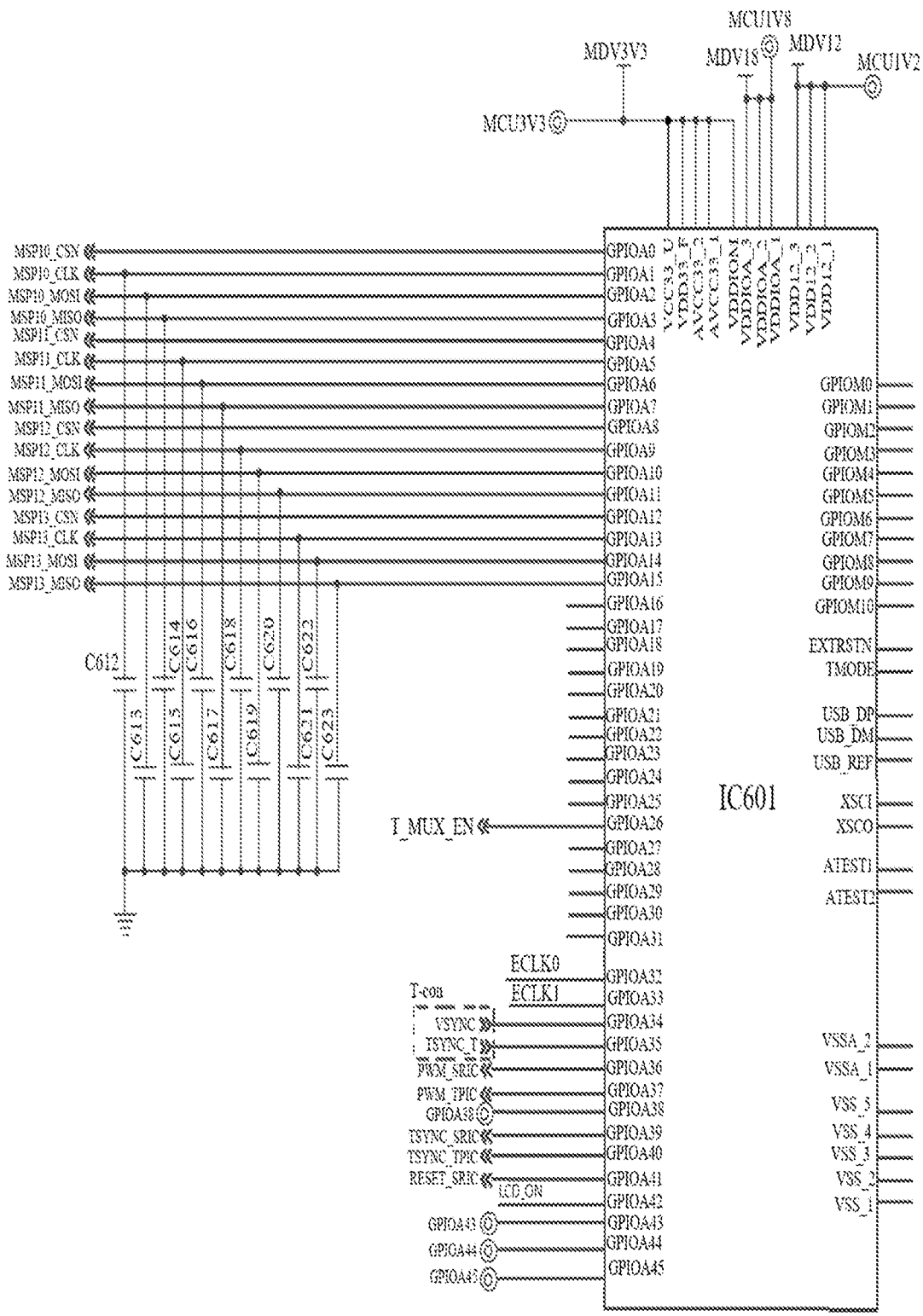
FIG. 17B is a structural diagram of a portion of a touch operation processing circuit in a display touch device according to at least one embodiment of the present disclosure.
Figure 17C:
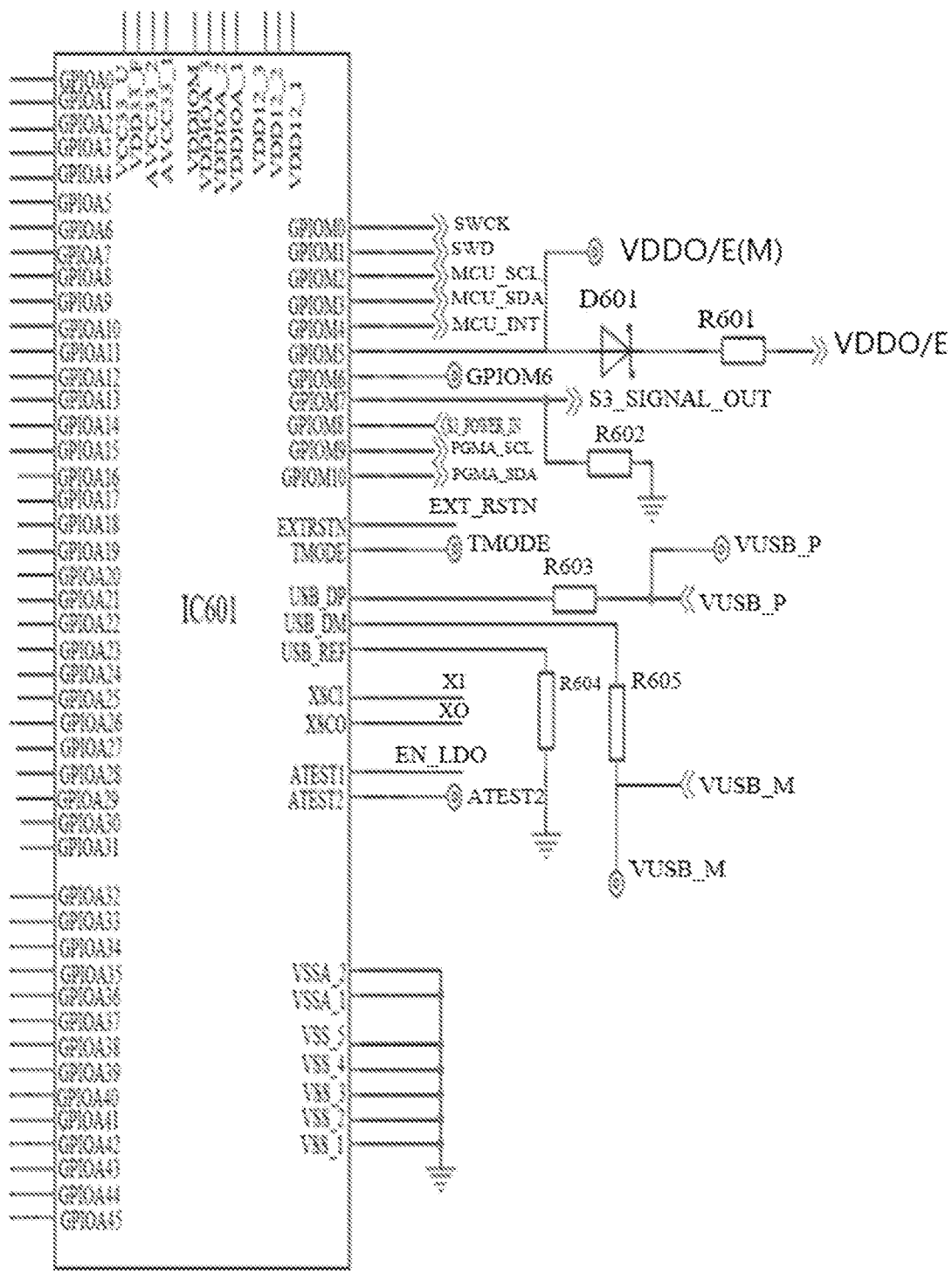
FIG. 17C is a structural diagram of a part of a touch operation processing circuit in a display touch device according to at least one embodiment of the present disclosure.

FIG. 17B is a structural diagram of a touch operation processing circuit in a display touch device according to at least one embodiment of the present disclosure, and FIG. 17C is a structural diagram of a touch operation processing circuit in the display touch device according to at least one embodiment of the present disclosure. FIG. 17B and FIG. 17C form a complete touch operation processing circuit.

FIG. 17A is a structural diagram of an MCU (Micro Control Unit) chip IC601 used in the touch operation processing circuit.

As shown in FIG. 17A, IC601 includes GPIOA0 pin, GPIOA1 pin, GPIOA2 pin, GPIOA3 pin, GPIOA4 pin, GPIOA5 pin, GPIOA6 pin, GPIOA7 pin, GPIOA8 pin, GPIOA9 pin, GPIOA10 pin, GPIOA11 pin, GPIOA12 pin, GPIOA13 pin, GPIOA14 pin, GPIOA15 pin, GPIOA16 pin, GPIOA17 pin, GPIOA18 pin, GPIOA19 pin, GPIOA20 pin, GPIOA21 pin, GPIOA22 pin, GPIOA23 pin, GPIOA24 pin, GPIOA25 pin, GPIOA26 pin, GPIOA27 pin, GPIOA28 pin, GPIOA29 pin, GPIOA30 pin, GPIOA31 pin, GPIOA32 pin, GPIOA33 pin, GPIOA34 pin, GPIOA35 pin, GPIOA36 pin, GPIOA37 pin, GPIOA38 pin, GPIOA39 pin, GPIOA40 pin, GPIOA41 pin, GPIOA42 pin, GPIOA43 pin, GPIOA44 pin, GPIOA45 pin, VSS_1 pin, VSS_2 pin, VSS_3 pin, VSS_4 pin, VSS_5 pin, VSSA_1 pin, VSSA_2 pin, ATEST2 pin, ATEST1 pin, ATEST2 pin, ATEST1 pin, XSCO pin, XSCI pin, USB_REF pin, USB_DM pin, USB_DP pin, TMODE pin, EXTRSTN pin, GPIOM0 pin, GPIOM1 pin, GPIOM2 pin, GPIOM3 pin, GPIOM4 pin, GPIOM5 pin, GPIOM6 pin, GPIOM7 pin, GPIOM8 pin, GPIOM9 pin, GPIOM10 pin, VDD12_1 pin, VDD12_2 pin, VDD12_3 pin, VDDIOA_1 pin, VDDIOA_2 pin, VDDIOA_3 pin, VDDIOM pin, AVCC33_1 pin, AVCC33_2 pin, VDD33_F pin and VDD33_U pin.

As shown in FIG. 17B, the touch operation processing circuit includes an MCU chip IC601, a first processing capacitor C612, a second processing capacitor C613, a third processing capacitor C614, a fourth processing capacitor C615, a fifth processing capacitor C616, a sixth processing capacitor C617, a seventh processing capacitor C618, a ninth processing capacitor C619, a tenth processing capacitor C620, an eleventh processing capacitor C621, a twelfth processing capacitor C622, and a thirteenth processing capacitor C623;

GPIOA0 is electrically connected to the first terminal MSP10_CSN, GPIOA1 is electrically connected to the second terminal MSP10_CLK, GPIOA2 is electrically connected to the third terminal MSP10_MOSI, GPIOA3 is electrically connected to the fourth terminal MSP10_MISO, GPIOA4 is electrically connected to the fifth terminal MSP11_CSN, and GPIOA5 is electrically connected to the sixth terminal MSP11_CLK, GPIOA6 is electrically connected to the seventh terminal MSP11_MOSI, GPIOA7 is electrically connected to the eighth terminal MSP11_MISO, GPIOA8 is electrically connected to the ninth terminal MSP12_CSN, GPIOA9 is electrically connected to the tenth terminal MSP12_CLK, GPIOA10 is electrically connected to the eleventh terminal MSP12_MOSI, GPIOA11 is electrically connected to the twelfth terminal MSP12_MISO, GPIOA12 is electrically connected to the thirteenth terminal MSP13_CSN, GPIOA13 is electrically connected to the fourteenth terminal MSP13_CLK, the GPIOA14 is electrically connected to the fifteenth terminal MSP13_MOSI, and the GPIOA15 is electrically connected to the sixteenth terminal MSP13_MISO;

The first end of C612 is grounded, and the second end of C612 is electrically connected to MSP10_CLK;

The first end of C613 is grounded, and the second end of C613 is electrically connected to MSP10_MOSI;

The first end of C614 is grounded, and the second end of C614 is electrically connected to MSP10_MISO;

The first end of C615 is grounded, and the second end of C612 is electrically connected to MSP11_CLK;

The first end of C616 is grounded, and the second end of C616 is electrically connected to MSP11_MOSI;

The first end of C617 is grounded, and the second end of C617 is electrically connected to MSP11_MISO;

The first end of C618 is grounded, and the second end of C618 is electrically connected to MSP12_CLK;

The first end of C619 is grounded, and the second end of C619 is electrically connected to MSP12_MOSI;

The first end of C620 is grounded, and the second end of C620 is electrically connected to MSP12_MISO;

The first end of C621 is grounded, and the second end of C621 is electrically connected to MSP13_CLK;

The first end of C622 is grounded, and the second end of C622 is electrically connected to MSP13_MOSI;

The first end of C623 is grounded, and the second end of C623 is electrically connected to MSP13_MISO;

The GPIOA32 pin of IC601 is connected to the first clock signal ECLK0, and the GPIOA33 pin of IC601 is connected to the second clock signal ECLK1;

The GPIOA34 pin of IC601 is connected to the first synchronization signal VSYNC, and the GPIOA35 pin of IC601 is connected to the second synchronization signal TSYNC_T; in FIG. 17B, T-con is the timing controller;

The GPIOA36 pin of IC601 is electrically connected to the first PWM signal terminal PWM_SRIC, and the GPIOA37 pin of IC601 is electrically connected to the second PWM signal terminal PWM_TPIC;

The GPIOA39 pin of IC601 is electrically connected to the third synchronization signal terminal TSYNC_SRIC, the GPIOA40 pin of IC601 is electrically connected to the fourth synchronization signal terminal TSYNC_TPIC, the GPIOA41 pin of IC601 is electrically connected to the first reset terminal RESET_SRIC; the GPIOA42 pin of IC601 is electrically connected to the first indication signal LCD_ON, and the GPIOA26 pin of IC601 is electrically connected to the multiplexing enable terminal T_MUX_EN.

As shown in FIG. 17B, the VDDIOM pin of IC601, the AVCC33_1 pin of IC601, the AVCC33_2 pin of IC601 and the VCC33_U pin of IC601 are all electrically connected to the first power supply terminal MCU3V3 and the second power supply terminal MDV3V3 respectively;

The VDDIOA_1 pin of IC601, the VDDIOA_2 pin of IC601 and the VDDIOA_2 pin of IC601 are all electrically connected to the third power supply terminal MCU1V8 and the fourth power supply terminal MDV18 respectively;

The VDD12_1 pin of IC601, the VDD12_2 pin of IC601 and the VDD12_3 pin of IC601 are all electrically connected to the fifth power supply terminal MCU1V2 and the sixth power supply terminal MDV12, respectively.

As shown in FIG. 17C, the touch operation processing circuit further includes a first processing diode D601, a first processing resistor R601, a second processing resistor R602, a third processing resistor R603, a fourth processing resistor R604 and a fifth processing resistor R605;

The anode of D601 is electrically connected to the GPIOM5 pin of IC601, the cathode of D601 is electrically connected to the first end of R601, and the second end of R601 is electrically connected to the eleventh voltage terminal VDDO/E;

The first end of R602 is electrically connected to the GPIOM7 pin of IC601, and the second end of R602 is grounded;

The first end of R603 is electrically connected to the USB_DP pin of IC601, and the second end of R603 is electrically connected to the twelfth voltage terminal VUSB_P;

The first end of R604 is electrically connected to the USB_REF pin of IC601, and the second end of R604 is grounded;

The first end of R605 is electrically connected to the USB_DM pin of IC601, and the second end of R605 is electrically connected to the thirteenth voltage terminal VUSB_M;

The anode of D601 is also electrically connected to the fourteenth voltage terminal VDDO/E(M);

The GPIOM0 pin of IC601 is electrically connected to the seventeenth terminal SWCK, the GPIOM1 pin of IC601 is electrically connected to the eighteenth terminal SWD, the GPIOM2 pin of IC601 is electrically connected to the eighteenth terminal MCU_SCL, the GPIOM3 pin of IC601 is electrically connected to the nineteenth terminal MCU_SDA, the GPIOM4 pin of IC601 is electrically connected to the eighteenth terminal MCU_INT, The GPIOM7 pin of IC601 is electrically connected to the nineteenth terminal S3_POWER_OUT, the GPIOM8 pin of IC601 is electrically connected to the twentieth terminal S3_POWER_IN, the GPIOM9 pin of IC601 is electrically connected to the twenty-first terminal PGMA_SCL, and the GPIOM10 pin of IC601 is electrically connected to the twenty-second terminal PGMA_SDA;

The XSCI pin of IC601 is electrically connected to the twenty-third terminal XI, and the XSCI pin of IC602 is electrically connected to the twenty-fourth terminal XO;

The ATEST1 pin of IC601 is electrically connected to the twenty-fifth terminal EN_LDO;

The VSS_1 pin of IC601, the VSS_2 pin of IC601, the VSS_3 pin of IC601, the VSS_4 pin of IC601, the VSS_5 pin of IC601, the VSSA_1 pin of IC601 and the VSSA_2 pin of IC601 are all grounded.

The control method described in the embodiment of the present disclosure is applied to the above-mentioned display touch device, and the control method includes:

When the touch operation processing circuit detects that the display touch device is in a touch-only detection state, providing, by the touch operation processing circuit, a first touch enable signal to the display touch driving circuit to control the display touch driving circuit to perform touch detection.

In the control method applied to a display touch device according to at least one embodiment of the present disclosure, when the touch operation processing circuit detects that the display touch device is in a touch-only detection state, the touch operation processing circuit provides a first touch enable signal to the display touch driving circuit to control the display touch driving circuit to perform touch detection, so that touch detection can be conveniently performed, and when the display touch device is in the sleep mode (at this time, the display function of the display touch device is turned off and the power consumption is low), the system can be woken up by using the touch function by clicking on the screen.

Optionally, the display touch device further includes a gate driving module; the control method further includes:

When the touch operation processing circuit detects that the display touch device is in a touch-only detection state, providing, by the touch operation processing circuit, a discharge control signal to the gate driving module, so that the gate driving module controls the grid lines to be turned on;

After the touch operation processing circuit provides a discharge control signal to the gate driving module, providing, by the touch operation processing circuit, the first touch enable signal to the display touch driving circuit.

In the control method according to at least one embodiment of the present disclosure, when the touch operation processing circuit detects that the display touch device is in a touch-only detection state, the touch operation processing circuit provides a discharge control signal to the gate driving module to control all gate lines included in the display panel to be turned on for discharging, and then the touch operation processing circuit provides a first touch enable signal to the display touch driving circuit to control the display touch driving circuit to perform touch detection, so as to ensure that when the display touch device resumes the display function again, display abnormal phenomena (e.g., flicker, afterimage, etc.) due to inability to discharge will not occur.

During specific implementation, the display touch device according to at least one embodiment of the present disclosure further includes a data driver, and the display panel further includes a plurality of data lines; the control method according to at least one embodiment of the present disclosure further includes:

When the touch operation processing circuit provides a discharge control signal to the gate driving module, providing a data driving control signal to the data driver, so that the data driver provides a common electrode voltage signal to the data line, so that the potential of the pixel electrode in the pixel circuit included in the display panel is the common electrode voltage, so that when the display touch device resumes the display function again, display abnormality will not occur.

In at least one embodiment of the present disclosure, the display touch device further includes a timing controller; the control method described in at least one embodiment of the present disclosure may further include:

When the display touch device is in a touch-only detection state, stopping, by the timing controller, outputting a second touch enable signal to the touch operation processing circuit;

When the touch operation processing circuit detects that the timing controller stops outputting the second touch enable signal, determining, by the touch operation processing circuit, that the display touch device is in a touch-only detection state.

In actual operation, when the display touch device is in a normal display touch state, the timing controller provides a second touch enable signal to the touch operation processing circuit, and when no front-end display signal is inputted, the display part is turned off and the touch function is retained. At this time, the timing controller does not provide a second touch enable signal to the touch operation processing circuit. When the touch operation processing circuit detects that the timing controller stops outputting the second touch enable signal, it can be determined that the display touch device is in a touch-only detection state.

During specific implementation, the display touch device further includes a power supply control circuit, a display power supply terminal, a touch power supply terminal and a power management module; the power management module is used to supply power to the gate driving module and the display touch driving circuit according to the power supply inputted by the voltage input terminal of the power management module; the control method according to at least one embodiment of the present disclosure may further include a power supply control step;

The power supply control step includes:

When the display power supply terminal provides a display power supply voltage, controlling, by the power supply control circuit, to connect the display power supply terminal and the voltage input terminal;

When the display power supply terminal does not provide the display power supply voltage and the touch power supply terminal provides the touch power supply voltage, controlling, by the power supply control circuit, to connect the touch power supply terminal and the voltage input terminal.

In the control method described in at least one embodiment of the present disclosure, when the display power supply terminal provides the display power supply voltage, the display power supply terminal supplies power to the gate driving module and the display touch driving circuit, and when the display power supply terminal does not provide the display power supply and the touch power supply terminal provides the touch power supply voltage, the touch power supply terminal supplies power to the gate driving module and the display touch driving circuit, so as to ensure that the display touch device can normally perform touch detection operations.

Optionally, the power supply control circuit includes a voltage dividing sub-circuit, a signal generation sub-circuit and a power supply control sub-circuit;

The power supply control step may specifically include:

When the display power supply terminal provides the display power supply voltage, dividing, by the voltage dividing sub-circuit, the display power supply voltage to generate and output the display working voltage through the display working voltage terminal;

The signal generating sub-circuit respectively generates and outputs a control signal through the control signal output terminal according to the display working voltage, and when the display working voltage is greater than a first predetermined voltage, the signal generating sub-circuit controls the control signal to be a first voltage signal, and when the display operating voltage is less than the first predetermined voltage, the signal generating sub-circuit controls the control signal to be a second voltage signal;

When the control signal is a first voltage signal, controlling, by the power supply control sub-circuit, to connect the display power supply terminal and the voltage input terminal, and when the control signal is a second voltage signal, controlling, by the power supply control sub-circuit, to connect the touch power supply terminal and the voltage input terminal.

During specific implementation, the display touch device may further include a system terminal; the control method described in at least one embodiment of the present disclosure may further include:

After the display touch driving circuit detects a touch event on the display panel, the display touch driving circuit provides a restart indication signal to the touch operation processing circuit;

After the touch operation processing circuit receives the restart instruction signal, the touch operation processing circuit provides a wake-up signal to the system terminal;

After the system terminal receives the wake-up signal, the system terminal controls the display touch driving circuit to perform display driving.

During specific implementation, the display touch device according to at least one embodiment of the present disclosure may further include a system terminal. When the display touch device is in a touch-only detection state, after the display panel is touched, the display touch driving circuit provides a restart instruction signal to the touch operation processing circuit, the touch operation processing circuit provides a wake-up signal to the system terminal, and the system terminal controls the display touch driving circuit to perform display driving, so that the display touch device resumes to the normal display touch state.

The display touch device provided by the embodiments of the present disclosure may be any product or component with display touch function, such as a mobile phone, a tablet computer, a television, a monitor, a notebook computer, a digital photo frame, and a navigator.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

The invention claimed is:

1. A display touch device, comprising a display panel, a display touch driving circuit and a touch operation processing circuit, wherein the display panel includes a plurality of gate lines;

the touch operation processing circuit is configured to provide a first touch enable signal to the display touch driving circuit when it is detected that the display touch device is in a touch-only detection state, to control the display touch driving circuit to perform touch detection, wherein the display touch device further comprises a power supply control circuit, a display power supply terminal, a touch power supply terminal and a power management module; wherein the power management module is configured to supply power to the display touch driving circuit according to a power supply voltage inputted by a voltage input terminal of the power management module;

the power supply control circuit is respectively electrically connected to the display power supply terminal, the touch power supply terminal and the power management module, and is configured to control to connect the display power supply terminal and the voltage input terminal when the display power supply terminal provides a display power supply voltage, and is configured to control to connect the touch power supply terminal and the voltage input terminal when the display power supply terminal does not provide the display power supply voltage and the touch power supply terminal provides a touch power supply voltage, wherein the power supply control circuit comprises a voltage dividing sub-circuit, a signal generation sub-circuit and a power supply control sub-circuit;

the voltage dividing sub-circuit is electrically connected to the display power supply terminal and the signal generating sub-circuit respectively, and is configured to divide the display power supply voltage when the display power supply terminal provides the display power supply voltage, to generate and output a display working voltage through a display working voltage terminal;

the signal generation sub-circuit is electrically connected to the display working voltage terminal and the control signal output terminal respectively, and is configured to generate and output a control signal through the control signal output terminal according to the display working voltage, when the display working voltage is greater than a first predetermined voltage, the control signal is controlled to be a first voltage signal, and when the display working voltage is less than the first predetermined voltage, the control signal is controlled to be a second voltage signal;

the power supply control sub-circuit is respectively electrically connected to the control signal output terminal, the display power supply terminal, the touch power supply terminal and the voltage input terminal, and is configured to control to connect the display power supply terminal and the voltage input terminal when the control signal is a first power supply signal, and control to connect the touch power supply terminal and the voltage input terminal when the control signal is the second voltage signal.

2. The display touch device according to claim 1, wherein the signal generating sub-circuit is integrated in the touch operation processing circuit.

3. The display touch device according to claim 1, wherein the first voltage signal is a low voltage signal, and the second voltage signal is a high voltage signal; or, the first voltage signal is the high voltage signal, the second voltage signal is the low voltage signal.

4. The display touch device according to claim 1, wherein the power supply control sub-circuit comprises a first switch sub-circuit, a second switch sub-circuit, a first inversion sub-circuit and a second inversion sub-circuit;

the first inversion sub-circuit is configured to perform phase inversion on the control signal to obtain a first inversion voltage signal, and provide the first inversion voltage signal to a control terminal of the second switch sub-circuit and the second inversion sub-circuit;

the second inversion sub-circuit is configured to perform phase inversion on the first inversion voltage signal to obtain a second inversion voltage signal, and provide the second inversion voltage signal to a control terminal of the first switch sub-circuit;

the first switch sub-circuit is configured to control to connect the display power supply terminal and the voltage input terminal when the second inversion voltage signal is the first voltage signal, and control to disconnect the display power supply terminal from the voltage input terminal when the second inversion voltage signal is the second voltage signal;

the second switch sub-circuit is configured to control to connect the touch power supply terminal and the voltage input terminal when the first inversion voltage signal is the first voltage signal, and control to disconnect the touch power supply terminal from the voltage input terminal when the first inversion voltage signal is the second voltage signal.

5. The display touch device according to claim 4, wherein the first switch sub-circuit includes a first switch transistor and a second switch transistor;

both a control electrode of the first switch transistor and a control electrode of the second switch transistor are electrically connected to the control terminal of the first switch sub-circuit;

a first electrode of the first switch transistor is electrically connected to the display power supply terminal, and a second electrode of the first switch transistor is electrically connected to a first electrode of the second switch transistor;

a second electrode of the second switch transistor is electrically connected to the voltage input terminal.

6. The display touch device according to claim 4, wherein the second switch sub-circuit comprises a third switch transistor;

a first electrode of the third switch transistor is electrically connected to the touch power supply terminal, and a second electrode of the third switch transistor is electrically connected to the voltage input terminal.

7. The display touch device according to claim 4, wherein the first inversion sub-circuit includes a first inversion transistor and a first resistor;

a control electrode of the first inversion transistor is electrically connected to the control signal output terminal, a first electrode of the first inversion transistor is electrically connected to the control end of the second switch sub-circuit, and a second electrode of the first inversion transistor is electrically connected to a third voltage terminal;

a first end of the first resistor is electrically connected to the control end of the second switch sub-circuit, and a second end of the first resistor is electrically connected to the touch power supply terminal.

8. The display touch device according to claim 4, wherein the second inversion sub-circuit includes a second inversion transistor and a second resistor;
a control electrode of the second inversion transistor is electrically connected to the control end of the second switch sub-circuit, a first electrode of the second inversion transistor is electrically connected to the touch power supply terminal, and a second electrode of the second inversion transistor is electrically connected to the third voltage terminal through the second resistor.

9. The display touch device according to claim 1, further comprising a control diode;
an anode of the control diode is electrically connected to a display power supply terminal, and a cathode of the control diode is electrically connected to a touch power supply terminal.

10. The display touch device according to claim 1, further comprising a system terminal, wherein
the touch operation processing circuit is further configured to provide a wake-up signal to the system terminal after a touch event on the display panel is detected;
the system terminal is configured to control the display touch driving circuit to perform display driving after receiving the wake-up signal.

11. The display touch device according to claim 1, wherein the display touch device further comprises a gate driving module;
when the touch operation processing circuit detects that the display touch device is in the touch-only detection state, the touch operation processing circuit provides a discharge control signal to the gate driving module, so that the gate driving module controls the plurality of gate lines to be turned on;
after the touch operation processing circuit provides the discharge control signal to the gate driving module, the touch operation processing circuit provides the first touch enable signal to the display touch driving circuit.

12. The display touch device according to claim 11, further comprising a data driver; wherein the display panel further comprises a plurality of data lines;
the touch operation processing circuit is further configured to provide a data driving control signal to the data driver when the discharge control signal is provided to the gate driving module, so that the data driver provides a common electrode voltage signal to the plurality of data lines.

13. The display touch device according to claim 1, further comprising a timing controller, wherein
the timing controller is configured to stop outputting a second touch enable signal to the touch operation processing circuit when the display touch device is in the touch-only detection state;
the touch operation processing circuit is configured to determine that the display touch device is in the touch-only detection state when it is detected that the timing controller stops outputting the second touch enable signal.

14. A control method, applied to a display touch device, wherein the display touch device comprises a display panel, a display touch driving circuit and a touch operation processing circuit, wherein the display panel includes a plurality of gate lines;
the touch operation processing circuit is configured to provide a first touch enable signal to the display touch driving circuit when it is detected that the display touch device is in a touch-only detection state, to control the display touch driving circuit to perform touch detection,
wherein the control method includes:
when the touch operation processing circuit detects that the display touch device is in the touch-only detection state, providing, by the touch operation processing circuit, the first touch enable signal to the display touch driving circuit to control the display touch driving circuit to perform touch detection,
wherein the display touch device further includes a power supply control circuit, a display power supply terminal, a touch power supply terminal and a power management module; the power management module is configured to supply power to the display touch driving circuit according to a power supply inputted by a voltage input terminal of the power management module; the control method further includes a power supply control step;
the power supply control step includes: when the display power supply terminal provides a display power supply voltage, controlling, by the power supply control circuit, to connect the display power supply terminal and the voltage input terminal; when the display power supply terminal does not provide the display power supply voltage and the touch power supply terminal provides a touch power supply voltage, controlling, by the power supply control circuit, to connect the touch power supply terminal and the voltage input terminal,
wherein the power supply control circuit includes a voltage dividing sub-circuit, a signal generation sub-circuit and a power supply control sub-circuit;
the power supply control step specifically includes:
when the display power supply terminal provides the display power supply voltage, dividing, by the voltage dividing sub-circuit, the display power supply voltage to generate and output a display working voltage through a display working voltage terminal;
generating and outputting, by the signal generating sub-circuit respectively, a control signal through the control signal output terminal according to the display working voltage, and when the display working voltage is greater than a first predetermined voltage, controlling, by the signal generating sub-circuit, the control signal to be a first voltage signal, and when the display operating voltage is less than the first predetermined voltage, controlling, by the signal generating sub-circuit, the control signal to be a second voltage signal;
when the control signal is the first voltage signal, controlling, by the power supply control sub-circuit, to connect the display power supply terminal and the voltage input terminal, and when the control signal is the second voltage signal, controlling, by the power supply control sub-circuit, to connect the touch power supply terminal and the voltage input terminal.

15. The control method according to claim 14, wherein the display touch device further comprises a system terminal; the control method further comprises:
after the touch operation processing circuit detects a touch event on the display panel, providing, by the touch operation processing circuit, a wake-up signal to system terminal;
after the system terminal receives the wake-up signal, controlling, by the system terminal, the display touch driving circuit to perform display driving.

16. The control method according to claim 14, wherein the display touch device further comprises a gate driving module; the control method further comprises:
- when the touch operation processing circuit detects that the display touch device is in the touch-only detection state, providing, by the touch operation processing circuit, a discharge control signal to the gate driving module, so that the gate driving module controls the plurality of gate lines to be turned on;
- after the touch operation processing circuit provides the discharge control signal to the gate driving module, providing, by the touch operation processing circuit, the first touch enable signal to the display touch driving circuit;

or

- wherein the display touch device further comprises a timing controller; the control method further comprises: when the display touch device is in the touch-only detection state, stopping, by the timing controller, outputting a second touch enable signal to the touch operation processing circuit; when the touch operation processing circuit detects that the timing controller stops outputting the second touch enable signal, determining, by the touch operation processing circuit, that the display touch device is in the touch-only detection state;
- wherein the display touch device further comprises a data driver, the display panel further comprises a plurality of data lines; the control method further comprises:
- when the touch operation processing circuit provides the discharge control signal to the gate driving module, providing a data driving control signal to the data driver, so that the data driver provides a common electrode voltage signal to the plurality of data lines.

* * * * *